United States Patent
Negri Jimenez et al.

(10) Patent No.: US 11,384,241 B2
(45) Date of Patent: Jul. 12, 2022

(54) THREE-DIMENSIONAL PRINTING

(71) Applicant: HEWLETT-PACKARD DEVELOPMENT COMPANY, L.P., Spring, TX (US)

(72) Inventors: Graciela Emma Negri Jimenez, San Diego, CA (US); Alexey S Kabalnov, San Diego, CA (US); Jacob Wright, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 126 days.

(21) Appl. No.: 16/499,510

(22) PCT Filed: Jan. 26, 2018

(86) PCT No.: PCT/US2018/015450
§ 371 (c)(1),
(2) Date: Sep. 30, 2019

(87) PCT Pub. No.: WO2019/147261
PCT Pub. Date: Aug. 1, 2019

(65) Prior Publication Data
US 2021/0277233 A1      Sep. 9, 2021

(51) Int. Cl.
*B33Y 10/00*     (2015.01)
*B29C 64/165*    (2017.01)
(Continued)

(52) U.S. Cl.
CPC ............ *C08L 77/06* (2013.01); *B29C 64/165* (2017.08); *B33Y 10/00* (2014.12); *B33Y 70/00* (2014.12);
(Continued)

(58) Field of Classification Search
CPC ..... B29C 64/165; B29C 64/153; B33Y 10/00; B33Y 10/80
See application file for complete search history.

(56) References Cited

U.S. PATENT DOCUMENTS 6,136,396 A    10/2000  Gilmer
6,706,920 B2   3/2004   Lamanna et al.
(Continued)

FOREIGN PATENT DOCUMENTS

CN    107236288 A        10/2017
WO    WO-2015108546 A2 * 7/2015  ........... B29C 64/165
(Continued)

OTHER PUBLICATIONS

Li, Chensha, et al., Improving the Antistatic Ability of Polypropylene Fibers, Oct. 2004, Composites Science and Technology.

*Primary Examiner* — Mary Lynn F Theisen
(74) *Attorney, Agent, or Firm* — HPI Patent Department

(57) ABSTRACT

According to examples described herein, methods, compositions, and parts comprising an antistatic agent are described. According to one example, a method of three-dimensional printing can comprise: (i) a layer of build material being deposited; (ii) a first fusing agent being selectively applied on the build material, wherein the first fusing agent can comprise at least one first antistatic agent; and (iii) repetition of (i) and (ii) at least once to form a core of a three-dimensional part.

14 Claims, 7 Drawing Sheets

(51) Int. Cl.
 B33Y 80/00 (2015.01)
 C08L 77/06 (2006.01)
 B33Y 70/00 (2020.01)
 B29K 77/00 (2006.01)
 B29K 105/00 (2006.01)

(52) U.S. Cl.
 CPC .......... B33Y 80/00 (2014.12); *B29K 2077/00* (2013.01); *B29K 2105/0008* (2013.01)

(56) References Cited

U.S. PATENT DOCUMENTS

| | | |
|---|---|---|
| 6,784,237 B2 | 8/2004 | Thompson et al. |
| 7,255,912 B2 | 8/2007 | Aylward et al. |
| 7,781,555 B2 | 8/2010 | Mogi |
| 8,883,896 B2 | 11/2014 | Oshita et al. |
| 2005/0095379 A1 | 5/2005 | Hayakawa et al. |
| 2007/0141329 A1 | 6/2007 | Yang et al. |
| 2015/0108546 A1 | 4/2015 | Murthy et al. |
| 2015/0158249 A1* | 6/2015 | Goto ................ B33Y 30/00 264/40.1 |

FOREIGN PATENT DOCUMENTS

| | | |
|---|---|---|
| WO | WO 2016088042 A1 | 6/2016 |
| WO | WO 2017189306 A1 | 11/2017 |

\* cited by examiner

THREE-DIMENSIONAL PRINTING

BACKGROUND

Three-dimensional (3D) printing can be an additive printing process used to make three-dimensional object(s) or part(s) from a digital model. 3D printing is often used in rapid product prototyping, mold generation, and mold master generation. Some 3D printing techniques are considered additive processes because they involve the application of successive layers of material. This is unlike machining processes, which tend to rely upon the removal of material to create the final part. Materials used in 3D printing tend to use curing or fusing, which for some materials may be accomplished using heat-assisted extrusion or sintering, and for other materials may be accomplished using digital light projection technology.

BRIEF DESCRIPTION OF THE DRAWING

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
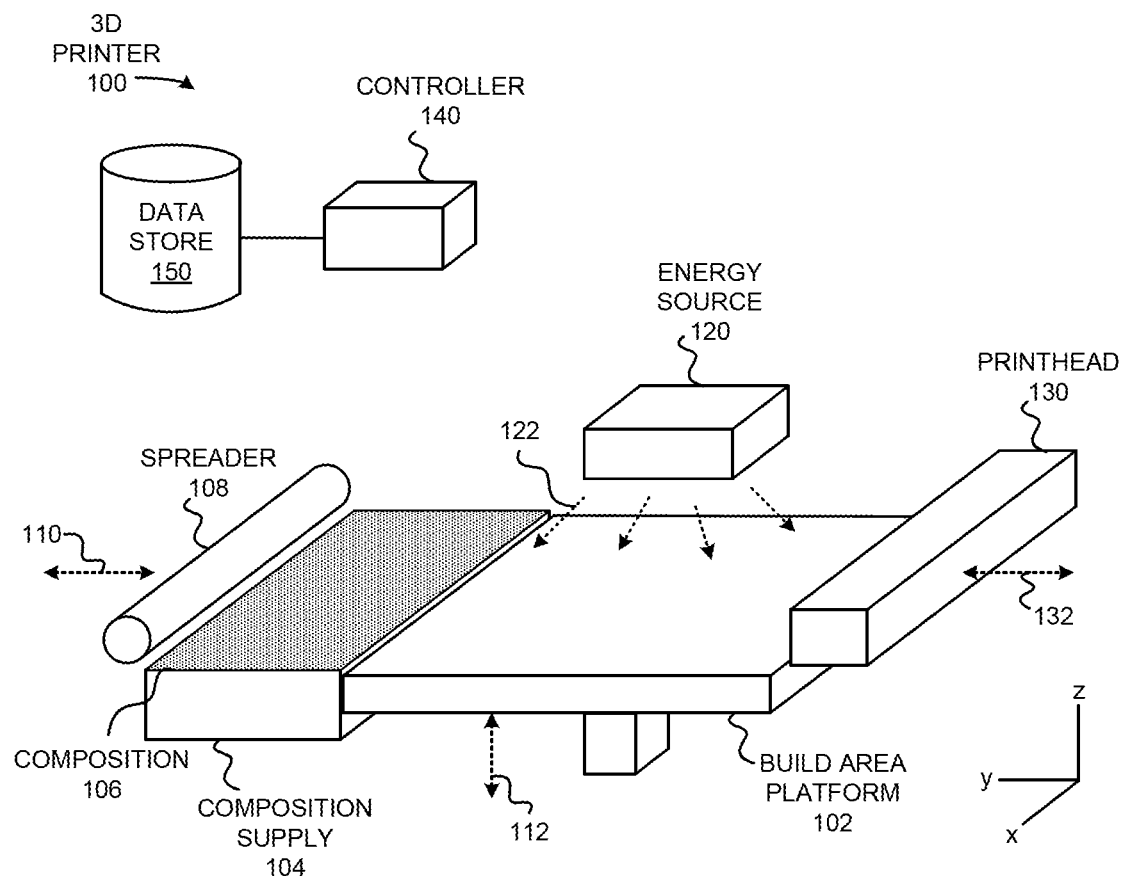
FIG. 1 shows an example of a simplified isometric view of an example three-dimensional (3D) printer for generating, building, or printing three-dimensional parts.

For simplicity and illustrative purposes, the present disclosure is described by examples. In the following description, numerous details are set forth in order to provide a thorough understanding of the present disclosure. It will be apparent, however, that the present disclosure may be practiced without limitation to these details in every example. In other instances, some methods and structures have not been described in detail so as not to unnecessarily obscure the present disclosure.

To reduce or eliminate build-up of static charge, plastic/polymeric parts/objects can require additives due to their insulating nature. Static build-up in polymeric parts/object is typically a result of the triboelectric effect, in which frictional contact between surfaces leads to electron transfer. If the polymeric part/object surface cannot dissipate the charge, an electrostatic discharge (ESD) event can result. In manufacturing settings, ESD events can negatively affect production, yield, cost, and/or product reliability, among other things. This is usually due to the potential for ESD to cause damage to sensitive circuitry and/or ignite flammable materials.

Similarly, in three-dimensional printing, ESD can similarly occur and result in polymeric parts/objects printed via three-dimensional printing. ESD in a 3D printed part can be reduced by imparting static dissipative or conductive properties to the part.

There is a need for methods and compositions to print 3D parts with reduced and/or no ESD. There is also a need for methods and compositions to reduce and/or eliminate ESD.

Disclosed herein are 3D printing methods, 3D printers implemented by the 3D printing methods, 3D printing compositions, and agents. A 3D part may be printed, formed, or otherwise generated onto a build area platform. The 3D printer may also include a spreader to spread a layer of a build material onto the build area platform, and a printhead to selectively deposit the agent. The 3D printer may form successive layers of the build material, which may be spread and may receive the agent. As used herein "3D printed part," "3D part," "3D object," "object," or "part" may be a completed 3D printed part or a layer of a 3D printed part.

In one example, disclosed is a method of three-dimensional printing comprising: (i) depositing a layer of build material; (ii) selectively applying a first fusing agent on the build material, wherein the first fusing agent comprises at least one first antistatic agent; and (iii) repeating (i) and (ii) at least once to form a core of a three-dimensional part.

The method further comprises (iv) applying a second fusing agent and a first detailing agent on the core of the three-dimensional part to form an inner shell at least partially enclosing the core, wherein the first detailing agent comprises at least one second antistatic agent; and (v) applying a second detailing agent on the inner shell, wherein the second detailing agent is free of any near infrared absorbing compound.

The second fusing agent further comprises at least one second near infrared absorbing compound; and the second detailing agent further comprises at least one third antistatic agent.

The first antistatic agent, the second antistatic agent, and the third antistatic agent are different; and the first near infrared absorbing compound and the second near infrared absorbing compound are different.

The first antistatic agent, the second antistatic agent, and the third antistatic agent are the same, and the first antistatic agent, the second antistatic agent, and the third antistatic agent are independently selected from the group consisting of $Li_2NiBr_4$, $Li_2CuCl_4$, $LiCuO$, $LiCu_4O(PO_4)_2$, $LiSOCl_2$, $LiSO_2Cl_2$, $LiSO_2$, $LiI_2$, $LiN_3$, $C_6H_5COOLi$, $LiBr$, $Li_2CO_3$, $LiCl$, $C_6H_{11}(CH_2)_3CO_2Li$, $LiBO_2$, $LiClO_4$, $Li_3PO_4$, $Li_2SO_4$, $Li_2B_4O_7$, $LiAlCl_4$, $AuCl_4Li$, $LiGaCl_4$, $LiBF_4$, $LiMnO_2$, $LiFeS_2$, $LiAg_2CrO_4$, $LiAg_2V_4O_{11}$, $LiSVO$, $LiCSVO$, $CF_3SO_3Li$, $LiPF_6$, $LiBF_4$, $LiClO_4$, $LiCuS$, $LiPbCuS$, $LiFeS$, $LiBi_2Pb_2O_5$, $LiBi_2O_3$, $LiV_2O_5$, $LiCoO_2$, $LiNiCoO_2$, $LiCuCl_2$, $Li/Al—V_2O_5$, lithium bis(oxalato)borate, $LiN(SO_2CF_3)_2$, $LiN(SOCF_2CF_3)_2$, $LiAsF_6$, $LiC(SO_2CF_3)_3$, $LiN(SO_2F)_2$, $LiN(SO_2F)(SO_2CF_3)$, $LiN(SO_2F)(SO_2C_4F_9)$, $LiOSO_2CF_3$, and combinations thereof.

The first antistatic agent, the second antistatic agent, and the third antistatic agent are independently selected from the group consisting of a salt of an alkali or alkaline earth metal selected from the group consisting of quaternary amines, chlorates, phosphates, carbonates, borates, phosphonates, sulfates, acetates, citrates, perchlorates, and combinations thereof.

The first antistatic agent is present in an amount of from about 0.1 wt. % to about 10 wt. % based upon a total weight of the first fusing agent; the second antistatic agent is present in an amount of from about 0.01 wt. % to about 7 wt. % based upon a total weight of the first detailing agent; and the third antistatic agent is present in an amount of from about 0.01 wt. % to about 7 wt. % based upon a total weight of the second detailing agent.

The first fusing agent further comprises water, at least one organic solvent, at least one surfactant, and at least one biocide.

In an example, disclosed is a three-dimensional printed part comprising: a core comprising a build material selected from the group consisting of polyamides, polyethers, polyethylenes, polyethylene terephthalates, polystyrenes, polyacetals, polypropylenes, polycarbonates, polyesters, thermoplastic polyurethanes, and combinations thereof, and at least one first antistatic agent.

The three-dimensional printed part can further comprise: an inner shell at least partially enclosing the core, the inner shell comprising the build material and (i) at least one second antistatic agent or (ii) free of any antistatic agent; and an external shell at least partially enclosing the inner shell, the external shell comprising the build material and (i) at least one third antistatic agent or (ii) free of any antistatic agent.

The first antistatic agent, the second antistatic agent, and the third antistatic agent can be the same or different. The first near infrared absorbing compound and the second near infrared absorbing compound can be the same or different.

The first antistatic agent, the second antistatic agent, and third antistatic agent are thermally stable at a polymer melt processing temperature. The first antistatic agent, the second antistatic agent, and the third antistatic agent are independently selected from the group consisting of $Li_2NiBr_4$, $Li_2CuCl_4$, $LiCuO$, $LiCu_4O(PO_4)_2$, $LiSOCl_2$, $LiSO_2Cl_2$, $LiSO_2$, $LiI_2$, $LiN_3$, $C_6H_5COOLi$, $LiBr$, $Li_2CO_3$, $LiCl$, $C_6H_{11}(CH_2)_3CO_2Li$, $LiBO_2$, $LiClO_4$, $Li_3PO_4$, $Li_2SO_4$, $Li_2B_4O_7$, $LiAlCl_4$, $AuCl_4Li$, $LiGaCl_4$, $LiBF_4$, $LiMnO_2$, $LiFeS_2$, $LiAg_2CrO_4$, $LiAg_2V_4O_{11}$, $LiSVO$, $LiCSVO$, $CF_3SO_3Li$, $LiPF_6$, $LiBF_4$, $LiClO_4$, $LiCuS$, $LiPbCuS$, $LiFeS$, $LiBi_2Pb_2O_5$, $LiBi_2O_3$, $LiV_2O_5$, $LiCoO_2$, $LiNiCoO_2$, $LiCuCl_2$, $Li/Al—V_2O_5$, lithium bis(oxalato)borate, $LiN(SO_2CF_3)_2$, $LiN(SOCF_2CF_3)_2$, $LiAsF_6$, $LiC(SO_2CF_3)_3$, $LiN(SO_2F)_2$, $LiN(SO_2F)(SO_2CF_3)$, $LiN(SO_2F)(SO_2C_4F_9)$, $LiOSO_2CF_3$, and combinations thereof.

The first antistatic agent, the second antistatic agent, and the third antistatic agent are independently selected from the group consisting of a salt of an alkali or alkaline earth metal selected from the group consisting of quaternary amines, chlorates, phosphates, carbonates, borates, phosphonates, sulfates, acetates, citrates, perchlorates, and combinations thereof.

The first antistatic agent is present in an amount of from about 0.1 wt. % to about 10 wt. % based upon a total weight of the core; the second antistatic agent is present in an amount of from about 0.01 wt. % to about 7 wt. % based upon a total weight of the inner shell; and the third antistatic agent is present in an amount of from about 0.01 wt. % to about 7 wt. % based upon a total weight of the outer shell.

The build material is polyamide-12, polyether block amide, or a combination thereof.

In one example, disclosed is a method of three-dimensional printing comprising: (i) depositing a layer of build material; (ii) selectively applying a first fusing agent comprising: at least one antistatic agent on the build material, at least one first near infrared absorbing compound, at least one surfactant, at least one organic solvent, and water; (iii) repeating (i) and (ii) at least once to form a core of a three-dimensional part; (iv) applying a second fusing agent and a first detailing agent on the core of the three-dimensional part to form an inner shell at least partially enclosing the core, wherein the second fusing agent comprises at least one second near infrared absorbing compound, and wherein the first detailing agent is free of any antistatic agent; and (v) applying a second detailing agent on the inner shell to at least partially enclose the inner shell and form an external shell, wherein the second detailing agent is free of (a) any near infrared absorbing compound and (b) any antistatic agent.

With reference first to FIG. 1, there is shown a simplified isometric view of an example 3D printer 100 for generating, building, or printing three-dimensional parts. It should be understood that the 3D printer 100 depicted in FIG. 1 may include additional components and that some of the components described herein may be removed and/or modified without departing from a scope of the 3D printer 100 disclosed herein. It should also be understood that the components of the 3D printer 100 depicted in FIG. 1 may not be drawn to scale and thus, the 3D printer 100 may have a different size and/or configuration other than as shown therein.

Figure 2:
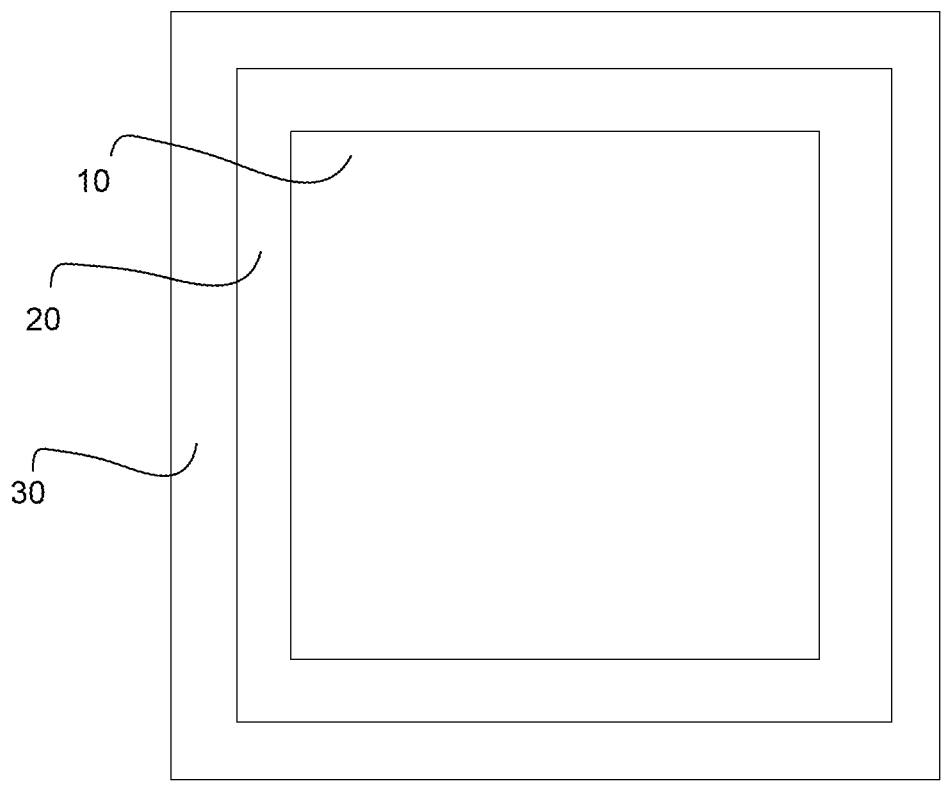
FIG. 2 shows an example three-dimensional printed part.

The 3D printer 100 may be used to form a three-dimensional printed part 40 shown in FIG. 2 comprising: a core 10 comprising a build material selected from the group consisting of polyamides, polyethers, polyethylenes, polyethylene terephthalates, polystyrenes, polyacetals, polypropylenes, polycarbonates, polyesters, thermoplastic polyurethanes, and combinations thereof, and at least one first antistatic agent.

The three-dimensional printed part can further comprise: an inner shell 20 at least partially enclosing the core 10, the inner shell 20 comprising the build material and (i) at least one second antistatic agent or (ii) free of any antistatic agent; and an external shell 30 at least partially enclosing the inner shell 20, the external shell 30 comprising the build material and (i) at least one third antistatic agent or (ii) free of any antistatic agent.

In some examples, the first antistatic agent, the second antistatic agent, and the third antistatic agent can be the same or in some examples, they can be different.

In some examples, the first antistatic agent, the second antistatic agent, and third antistatic agent can be thermally stable at a polymer melt processing temperature.

In some examples, the first antistatic agent, the second antistatic agent, and the third antistatic agent can be independently selected from the group consisting of $Li_2NiBr_4$, $Li_2CuCl_4$, $LiCuO$, $LiCu_4O(PO_4)_2$, $LiSOCl_2$, $LiSO_2Cl_2$, $LiSO_2$, $LiI_2$, $LiN_3$, $C_6H_5COOLi$, $LiBr$, $Li_2CO_3$, $LiCl$, $C_6H_{11}(CH_2)_3CO_2Li$, $LiBO_2$, $LiClO_4$, $Li_3PO_4$, $Li_2SO_4$, $Li_2B_4O_7$, $LiAlCl_4$, $AuCl_4Li$, $LiGaCl_4$, $LiBF_4$, $LiMnO_2$, $LiFeS_2$, $LiAg_2CrO_4$, $LiAg_2V_4O_{11}$, $LiSVO$, $LiCSVO$, $CF_3SO_3Li$, $LiPF_6$, $LiBF_4$, $LiClO_4$, $LiCuS$, $LiPbCuS$, $LiFeS$, $LiBi_2Pb_2O_5$, $LiBi_2O_3$, $LiV_2O_5$, $LiCoO_2$, $LiNiCoO_2$, $LiCuCl_2$, $Li/Al—V_2O_5$, lithium bis(oxalato)borate, $LiN(SO_2CF_3)_2$, $LiN(SOCF_2CF_3)_2$, $LiAsF_6$, $LiC(SO_2CF_3)_3$, $LiN(SO_2F)_2$, $LiN(SO_2F)(SO_2CF_3)$, $LiN(SO_2F)(SO_2C_4F_9)$, $LiOSO_2CF_3$, and combinations thereof.

In some examples, the first antistatic agent, the second antistatic agent, and the third antistatic agent can be independently selected from the group consisting of a salt of an alkali or alkaline earth metal selected from the group consisting of quaternary amines, chlorates, phosphates, carbonates, borates, phosphonates, sulfates, acetates, citrates, perchlorates, and combinations thereof.

In some examples, the first antistatic agent can be present in an amount of from about 0.1 wt. % to about 10 wt. % based upon a total weight of the first fusing agent, or in an amount of from about 0.5 wt. % to about 9 wt. % based upon a total weight of the first fusing agent, or in an amount of from about 1 wt. % to about 8 wt. % based upon a total weight of the first fusing agent, or in an amount of from about 2 wt. % to about 7 wt. % based upon a total weight of the first fusing agent, or in an amount of less than about 10 wt. % based upon a total weight of the first fusing agent, or in an amount of less than about 9 wt. % based upon a total weight of the first fusing agent, or in an amount of less than about 8 wt. % based upon a total weight of the first fusing agent, or in an amount of less than about 7 wt. % based upon a total weight of the first fusing agent, or in an amount of less than about 6 wt. % based upon a total weight of the first fusing agent, or in an amount of less than about 5 wt. % based upon a total weight of the first fusing agent, or in an amount of less than about 4 wt. % based upon a total weight of the first fusing agent, or in an amount of greater than about 0.1 wt. % based upon a total weight of the first fusing agent, or in an amount of greater than about 0.5 wt. % based upon a total weight of the first fusing agent, or in an amount of greater than about 1 wt. % based upon a total weight of the first fusing agent, or in an amount of greater than about 2 wt. % based upon a total weight of the first fusing agent, or in an amount of greater than about 3 wt. % based upon a total weight of the first fusing agent, or in an amount of greater than about 4 wt. % based upon a total weight of the first fusing agent, or in an amount of greater than about 5 wt. % based upon a total weight of the first fusing agent, or in an amount of greater than about 6 wt. % based upon a total weight of the first fusing agent, or in an amount of greater than about 7 wt. % based upon a total weight of the first fusing agent, or in an amount of greater than about 8 wt. % based upon a total weight of the first fusing agent, or in an amount of greater than about 9 wt. % based upon a total weight of the first fusing agent.

In some examples, the second antistatic agent is present in an amount of from about 0.01 wt. % to about 7 wt. % based upon a total weight of the first detailing agent, or in an amount of from about 0.1 wt. % to about 6 wt. % based upon a total weight of the first detailing agent, or in an amount of from about 1 wt. % to about 5 wt. % based upon a total weight of the first detailing agent, or in an amount of from about 2 wt. % to about 4 wt. % based upon a total weight of the first detailing agent, or in an amount of less than about 7 wt. % based upon a total weight of the first detailing agent, or in an amount of less than about 6 wt. % based upon a total weight of the first detailing agent, or in an amount of less than about 5 wt. % based upon a total weight of the first detailing agent, or in an amount of less than about 4 wt. % based upon a total weight of the first detailing agent, or in an amount of less than about 3 wt. % based upon a total weight of the first detailing agent, or in an amount of less than about 2 wt. % based upon a total weight of the first detailing agent, or in an amount of less than about 1 wt. % based upon a total weight of the first detailing agent, or in an amount of greater than about 0.01 wt. % based upon a total weight of the first detailing agent, or in an amount of greater than about 0.1 wt. % based upon a total weight of the first detailing agent, or in an amount of greater than about 1 wt. % based upon a total weight of the first detailing agent, or in an amount of greater than about 2 wt. % based upon a total weight of the first detailing agent, or in an amount of greater than about 3 wt. % based upon a total weight of the first detailing agent, or in an amount of greater than about 4 wt. % based upon a total weight of the first detailing agent, or in an amount of greater than about 5 wt. % based upon a total weight of the first detailing agent, or in an amount of greater than about 6 wt. % based upon a total weight of the first detailing agent.

In some examples, the third antistatic agent is present in an amount of from about 0.01 wt. % to about 7 wt. % based upon a total weight of the second detailing agent, or in an amount of from about 0.1 wt % to about 6 wt. % based upon a total weight of the second detailing agent, or in an amount of from about 1 wt. % to about 5 wt. % based upon a total weight of the second detailing agent, or in an amount of from about 2 wt. % to about 4 wt. % based upon a total weight of the second detailing agent, or in an amount of less than about 7 wt. % based upon a total weight of the second detailing agent, or in an amount of less than about 6 wt. % based upon a total weight of the second detailing agent, or in an amount of less than about 5 wt. % based upon a total weight of the second detailing agent, or in an amount of less than about 4 wt. % based upon a total weight of the second detailing agent, or in an amount of less than about 3 wt. % based upon a total weight of the second detailing agent, or in an amount of less than about 2 wt. % based upon a total weight of the second detailing agent, or in an amount of less than about 1 wt. % based upon a total weight of the second detailing agent, or in an amount of greater than about 0.01 wt. % based upon a total weight of the second detailing agent, or in an amount of greater than about 0.1 wt. % based upon a total weight of the second detailing agent, or in an amount of greater than about 1 wt. % based upon a total weight of the second detailing agent, or in an amount of greater than about 2 wt. % based upon a total weight of the second detailing agent, or in an amount of greater than about 3 wt. % based upon a total weight of the second detailing agent, or in an amount of greater than about 4 wt. % based upon a total weight of the second detailing agent, or in an amount of greater than about 5 wt. % based upon a total weight of the second detailing agent, or in an amount of greater than about 6 wt. % based upon a total weight of the second detailing agent.

In some examples, the build material can be polyamide-12, polyether block, amide, or a combination thereof.

Build Material

The build material 106 may be a powder, a short fiber, a liquid, a paste, or a gel. In an example, the powder may be formed from, or may include short fibers, that may, for example, have been cut into short lengths from long strands, or threads of build material. The build material may be a polymeric material, metal material, or may be a composite material of polymer and ceramic. Non-limiting examples of build material include semi-crystalline thermoplastic materials with a wide processing window of greater than 5° C. (i.e., the temperature range between the melting point and the re-crystallization temperature. Some specific examples of the polymeric build material 12 include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other specific examples of the build material include polyethylene, polyether, polyethylene terephthalate (PET), and an amorphous variation of these materials. Still other examples of suitable build material include polystyrene, polyacetals, polypropylene, polycarbonate, polyester, thermoplastic polyurethanes, other engineering plastics, and blends of any two or more of the polymers listed herein. In an example, the build material may be selected from the group consisting of polyethylenes, polyethylene terephthalates, polystyrenes, polyacetals, polypropylenes, polycarbonates, polyesters, thermoplastic polyurethanes, and combinations thereof.

Any of the previously listed build materials may be combined with ceramic particles to form the composite build material. Examples of suitable ceramic particles include metal oxides, inorganic glasses, carbides, nitrides, and borides. Some specific examples include alumina ($Al_2O_3$), glass, silicon mononitride (SIN), silicon dioxide ($SiO_2$), zirconia ($ZrO_2$), titanium dioxide ($TiO_2$), $Na_2O/CaO/SiO_2$ glass (soda-lime glass), silicon carbide (SiC), silicon nitride (Si3N4), yttrium oxide-stabilized zirconia (YTZ), or combinations thereof. The amount of ceramic particles that may be combined with the build material may depend on the build material used, the ceramic particles used, and the 3D part 40 to be formed.

The build material may have a melting point ranging from about 50° C. to about 400° C. As an example, the build material may be a polyamide having a melting point of 180° C., or thermoplastic polyurethanes having a melting point ranging from about 100° C. to about 165° C.

The build material may also include a binder, such as a polymer binder, a metal nanoparticle binder, or combinations thereof. The polymer binder may be a semi-crystalline polymer, such as polypropylene and polyethylene. The polymer binder may be a non-crystalline polymer, such as polyethylene oxide, polyethylene glycol (solid), acrylonitrile butadiene styrene, polystyrene, styrene-acrylonitrile resin, and polyphenyl ether. The polymer binder may be one of polypropylene, polyethylene, poly(methyl methacrylate), low density polyethylene, high density polyethylene, polyethylene oxide, polyethylene glycol, acrylonitrile butadiene styrene, polystyrene, styrene-acrylonitrile resin, polyphenyl ether, polyamide 11, polyamide 12, polymethyl pentene, polyoxymethylene, polyethylene terephthalate, polybutylene terephthalate, polyvinylidene fluoride, polytetrafluoroethylene, perfluoroalkoxy alkane, polyphenylene sulfide, polyurethanes, polyvinyl alcohol, polylactic acid, or polyether ether ketone.

The polymer binder may have a melting point temperature less than about 250° C., for example the melting point temperature may range from about 50° C. to about 249° C., for example from about 60° C. to about 240° C., and as a further example from about 70° C. to about 235° C.

Charging Agent

It is to be understood that the build material may also include a charging agent, a flow aid, or combinations thereof. A charging agent may be added to suppress tribocharging. Examples of suitable charging agent(s) include, but are not limited to, aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include a natural based ethoxylated alkylamine, a fatty acid ester, and an alkane sulfonate.

In an example, the charging agent may be added in an amount ranging from greater than about 0 wt. % to less than about 5 wt. % based upon the total wt. % of the build material.

Flow Aid

A flow aid may be added to improve the flowability of the build material by reducing the friction, the lateral drag, and the tribocharge buildup (by increasing the particle conductivity). Non-limiting examples of suitable flow aids include tricalcium phosphate, powdered cellulose, magnesium stearate, sodium bicarbonate, sodium ferrocyanide, potassium ferrocyanide, calcium ferrocyanide, bone phosphate, sodium silicate, silicon dioxide, calcium silicate, magnesium silicate, talcum powder, sodium aluminosilicate, potassium aluminum silicate, calcium aluminosilicate, bentonite, aluminum silicate, stearic acid, and polydimethylsiloxane.

In an example, the flow aid may be added in an amount ranging from greater than about 0 wt. % to less than about 5 wt. % based upon the total wt. % of the build material.

Fusing Agents & Detailing Agents

The agent, such as a fusing agent or detailing agent, may be a composition including various components that may be selectively applied to the layer of the build material 106. Non-limiting examples of components of the agent include an aqueous vehicle, a non-aqueous vehicle, chemical binders, a colorant, a solvent, a co-solvent, a surfactant, a dispersant, a biocide, an anti-kogation agent, viscosity modifiers, buffers, stabilizers, and combinations thereof. The presence of a co-solvent, a surfactant, and/or a dispersant in the agent may assist in obtaining a particular wetting behavior with the build material 106. A fusing agent may include similar or different components than the detailing agent. Additionally, a first detailing agent used to form an inner shell 20 may be the same or different from a second detailing agent used to form an external shell 30. Further, a first fusing agent used to form a core 10 may be the same or different from the first detailing agent used to form an inner shell 20. In an example, more than one agent, such as a fusing agent and/or detailing agent(s), may be used during the 3D printing process.

In some examples, the agent may be one or more fusing agents. The fusing agent may be applied over the build material. Upon application of energy, such as electromagnetic radiation, the fusing agent absorbs the electromagnetic radiation energy and allows successive layers of build material to fuse together to form a core of a 3D part.

In some examples, the agent may be a detailing agent. The detailing agent may provide a cooling effect. The detailing agent may be selectively applied to areas to achieve uniform temperatures. Additionally, the detailing agent may be selectively applied to areas in an effort to simplify cleaning and post-processing. In an example, the detailing agent may be used in combination with an antistatic agent. For example, the detailing agent and the antistatic agent may be applied simultaneously to the same selected area from different printheads or the detailing agent and the antistatic agent may be present in a single composition and applied to the same selected area from the same printhead.

In some examples, an agent may include from about 1 wt. % to about 10 wt. % of colorant, from about 10 wt. % to about 30 wt. % of co-solvent(s), from about 0.5 wt. % to about 2 wt. % of dispersant(s), from 0.01 wt. % to about 1 wt. % of anti-kogation agent(s), from about 0.1 wt. % to about 5 wt. % of binder(s), from about 0.05 wt. % to about 0.1 wt. % biocide(s), and a balance of water. Another example may include from about 1 wt. % to about 7 wt. % of colorant, from about 10 wt % to about 30 wt. % of co-solvent(s), from about 0.25 wt. % to about 2 wt. % of dispersant(s), from 0.05 wt. % to about 0.1 wt. % of chelating agent(s), from about 0.005 wt. % to about 0.2 wt. % of buffer(s), from about 0.05 wt. % to about 0.1 wt. % biocide(s), and a balance of water.

A method of making a detailing agent may include combining various components to form the antistatic agent. In particular, the method may include combining a co-solvent in an amount of from about 10 wt. % to about 30 wt. %, a wetting additive, a surfactant in an amount of from about 0.1 wt % to about 3 wt %, a biocide in an amount of from about 0.05 wt. % to about 0.1 wt. %, a salt of an alkali or alkaline earth metal in an amount of from about 0.01 wt. % to about 20 wt. %, and a balance of water.

Following selective deposition of the agent onto selected areas of the layer of the build material 106, the build area platform 102 may be lowered as denoted by the arrow 112, e.g., along the z-axis. In addition, the spreader 108 may be moved across the build area platform 102 to form a new layer of build material 106 on top of the previously formed layer. In an example, the spreader 108 may spread a layer of build material 106. Moreover, the printhead 130 may deposit the agent onto predetermined areas of the new layer of build material 106. For example, the printhead 130 may deposit an antistatic agent over a first select area to form an external shell 30 of the 3D printed part 40. A second printhead may deposit a first and/or second fusing agent over a second select area of a layer of the build material 106 to form an inner shell 20. The first printhead may simultaneously or sequentially deposit an antistatic agent to the second select area to form the inner shell 20. In a further example, the second printhead may deposit a first and/or second fusing agent over a third select area of a layer of the build material 106 to form a core 10. The above-described process may be repeated until a predetermined number of layers has been formed to fabricate a desired 3D part.

As also shown in FIG. 1, the 3D printer 100 may include a controller 140 that may control operations of the build area platform 102, the build material supply 104, the spreader 108, the energy source 120, and the printhead 130. The controller 140 is also depicted as being in communication with a data store 150. The data store 150 may include data pertaining to a 3D part to be printed by the 3D printer 100.

A 3D printed part may be created from areas of the build material 106 that have received the agent from the printhead 130. Upon application of energy 122, such as by heat lamps, ultraviolet lights, and the like, the selectively deposited agent may absorb the energy.

The applied energy 122 may be removed and 3D printed part may cool by removal of the energy. Upon cooling, the formed 3D printed part may solidify. The 3D printed part may include the external shell, the inner shell, and the core, in which the core is at least partially encompassed by the inner shell. In an example, the core is at least about 50% encompassed by the inner shell, for example, at least about 75%, and as a further example, at least about 90% encompassed by the inner shell. In an example, the core is completely encompassed by the shell. In an example, the inner shell is at least about 50% encompassed by the external shell, for example, at least about 75%, and as a further example, at least about 90% encompassed by the external shell. In an example, the inner shell is completely encompassed by the external shell.

Figure 3:
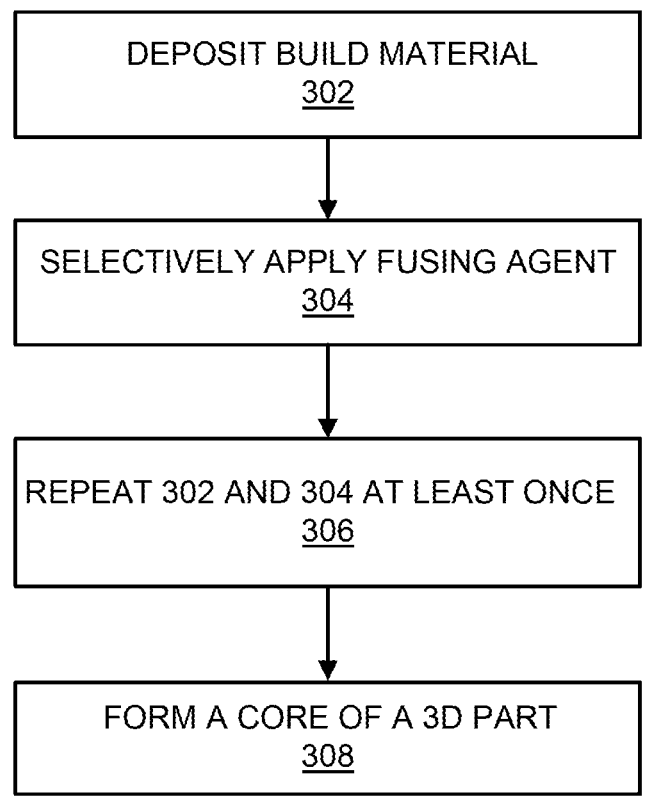
FIGS. 3 and 4 each respectively show flow diagrams of example methods of three-dimensional printing.
Figure 4:
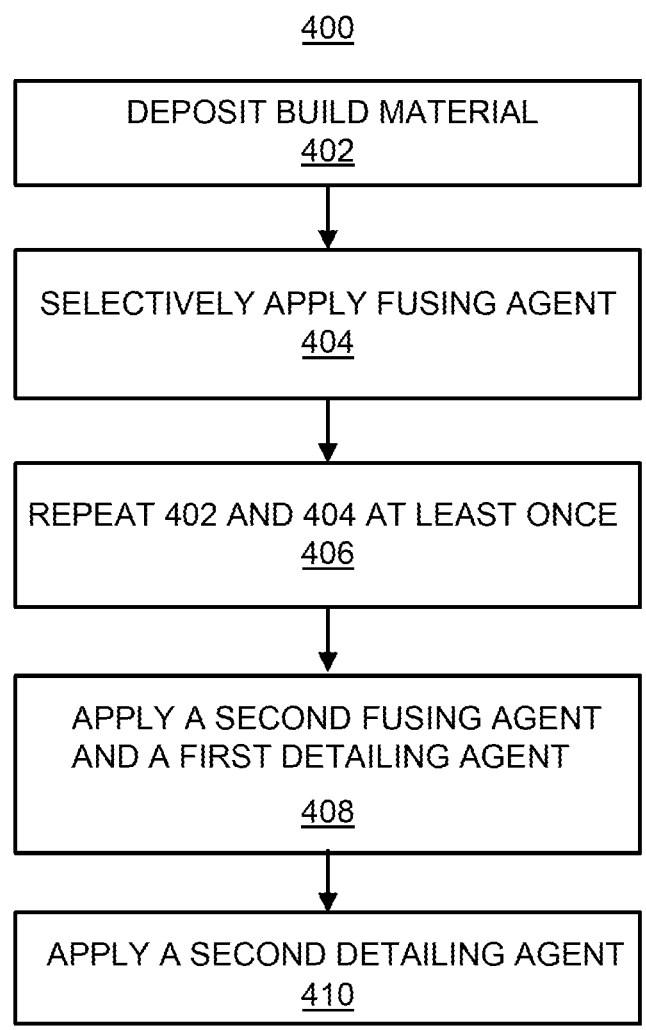

Various manners in which an example 3D part may be fabricated are discussed in greater detail with respect to the example methods 200 and 300 respectively depicted in FIGS. 3 and 4. It should be apparent to those of ordinary skill in the art that the methods 200 and 300 may represent generalized illustrations and that other operations may be added or existing operations may be removed, modified, or rearranged without departing from the scopes of the methods 200 and 300.

The descriptions of the methods 200 and 300 are made with reference to the 3D printer 100 illustrated in FIG. 1 for purposes of illustration. It should, however, be clearly understood that 3D printers and other types of apparatuses having other configurations may be implemented to perform either or both of the methods 200 and 300 without departing from the scopes of the methods 200 and 300.

Prior to execution of the method 200 or as part of the method 200, the 3D printer 100 may access data pertaining to a 3D part that is to be printed. By way of example, the controller 140 may access data stored in the data store 150 pertaining to a 3D part that is to be printed. The controller 140 may determine the number of layers of build material 106 that are to be formed and the locations at which an agent from the printhead 130 is to be selectively deposited on areas, to impart improved strength, of each of the respective layers of build material 106.

In some examples, fusing agent(s) may be compatible with polymers, such as the build material 106. The fusing agent comprising at least one antistatic agent may be able to reduce static charge that may accumulate on a 3D printed part 40. The fusing agent may be thermally stable at a polymer melt processing temperature.

For example, the antistatic agent may be thermally stable at temperatures for formation of the 3D printed part 40, for example, from about 50° C. to about 400° C. The antistatic agent may be liquid at room temperature, for example, about 25° C.

In an example, the antistatic agent does not absorb, or minimally absorbs, light in a near infrared wavelength (120 THz-400 THz/2500 nm-750 nm). For example, 20% or less radiation may be absorbed in the near infrared wavelength by the antistatic agent. Additionally, the antistatic agent may be transparent in the near infrared wavelength, for example, 80% or greater radiation may be transmitted by the antistatic agent in a near infrared wavelength.

The fusing agent may be a composition that may include various components that may impart antistatic or charge dissipating properties. In an example, the fusing agent may include a water soluble antistatic agent compound. The fusing agent may be formed of conductive materials that are electrically conductive, thermally conductive, or both.

In some examples, disclosed herein is a fusing agent composition for three-dimensional printing comprising: at least one antistatic agent in an amount of from about 0.01 wt % to about 20 wt % based on a total weight of the fusing agent composition, at least one near infrared absorbing compound, at least one surfactant, at least one organic solvent, and water.

The antistatic agent is selected from the group consisting of $Li_2NiBr_4$, $Li_2CuCl_4$, $LiCuO$, $LiCu_4O(PO_4)_2$, $LiSOCl_2$, $LiSO_2Cl_2$, $LiSO_2$, $LiI_2$, $LiN_3$, $C_6H_5COOLi$, $LiBr$, $Li_2CO_3$, $LiCl$, $C_6H_{11}(CH_2)_3CO_2Li$, $LiBO_2$, $LiClO_4$, $Li_3PO_4$, $Li_2SO_4$, $Li_2B_4O_7$, $LiAlCl_4$, $AuCl_4Li$, $LiGaCl_4$, $LiBF_4$, $LiMnO_2$, $LiFeS_2$, $LiAg_2CrO_4$, $LiAg_2V_4O_{11}$, $LiSVO$, $LiCSVO$, $CF_3SO_3Li$, $LiPF_6$, $LiBF_4$, $LiClO_4$, $LiCuS$, $LiPb$-$CuS$, $LiFeS$, $LiBi_2Pb_2O_5$, $LiBi_2O_3$, $LiV_2O_5$, $LiCoO_2$, $LiNiCoO_2$, $LiCuCl_2$, $Li/Al$—$V_2O_5$, lithium bis(oxalato)borate, $LiN(SO_2CF_3)_2$, $LiN(SOCF_2CF_3)_2$, $LiAsF_6$, $LiC(SO_2CF_3)_3$, $LiN(SO_2F)_2$, $LiN(SO_2F)(SO_2CF_3)$, $LiN(SO_2F)(SO_2C_4F_9)$, $LiOSO_2CF_3$, and combinations thereof.

The antistatic agent includes a salt of an alkali or alkaline earth metal selected from the group consisting of quaternary amines, chlorates, phosphates, carbonates, borates, phosphonates, sulfates, acetates, citrates, perchlorates, and combinations thereof.

The antistatic agent is thermally stable at a polymer melt processing temperature.

The near infrared absorbing compound is selected from the group consisting of carbon black, oxonol, squarylium, chalcogenopyrylarylidene, bis(chalcogenopyrylo)polymethine, bis(aminoaryl)polymethine, merocyanine, trinuclear cyanine, indene-crosslinked polymethine, oxyindolidine, iron complexes, quinoids, nickel-dithiolene complex, cyanine dyes, and combinations thereof.

The cyanine dyes are selected from the group consisting of carbocyanine, azacarbocyanine, hemicyanine, styryl, diazacarbocyanine, triazacarbocyanine, diazahemicyanine, polymethinecyanine, azapolymethinecyanine, holopolar, indocyanine, diazahemicyanine dyes, and combinations thereof.

The near infrared absorbing compound is present in an amount of from about 0.1 wt % to about 10 wt % based on the total weight of the fusing agent.

In some examples, disclosed herein is a liquid functional agent composition for three-dimensional printing comprising: a first fusing agent comprising: at least one first antistatic agent, at least one first near infrared absorbing compound, at least one surfactant, at least one organic solvent, and water; a second fusing agent comprising at least one second near infrared absorbing compound; a first detailing agent; and a second detailing agent free of any near infrared absorbing compound.

In some examples, the first detailing agent comprises at least one second antistatic agent; and the second detailing agent further comprises at least one third antistatic agent.

In some examples, the first antistatic agent, the second antistatic agent, and the third antistatic agent are all the same; and the first near infrared absorbing compound and the second near infrared absorbing compound are the same.

In some examples, the first antistatic agent, the second antistatic agent, and the third antistatic agent are different; and the first near infrared absorbing compound and the second near infrared absorbing compound are different.

In some examples, disclosed herein is a method of applying a liquid functional agent in three-dimensional printing comprising: (A) (i) depositing a layer of build material, (ii) selectively applying a first fusing agent on the build material, and (iii) repeating (i) and (ii) at least once to form a core of a three-dimensional part; wherein the first fusing agent comprises: at least one first antistatic agent, at least one first near infrared absorbing compound, at least one surfactant, at least one organic solvent, and water; (B) applying a second fusing agent and a first detailing agent on the core of the three-dimensional part to form an inner shell at least partially enclosing the core, herein the first detailing agent comprises at least one second antistatic agent; and (C) applying a second detailing agent on the inner shell, wherein the second detailing agent is free of any near infrared absorbing compound.

In some examples, (B) the second fusing agent further comprises at least one second near infrared absorbing compound; and (C) the second detailing agent further comprises at least one third antistatic agent.

In some examples, the first near infrared absorbing compound and the second near infrared absorbing compound are the same and selected from the group consisting of carbon black, oxonol, squarylium, chalcogenopyrylarylidene, bis(chalcogenopyrylo)polymethine, bis(aminoaryl)polymethine, merocyanine, trinuclear cyanine, indene-crosslinked polymethine, oxyindolidine, iron complexes, quinoids, nickel-dithiolene complex, cyanine dyes, and combinations thereof.

Antistatic Agents

In some examples, the antistatic agent may include a salt of an alkali or alkaline earth metal. The salt of the alkali or alkaline earth metal may include quaternary amines, chlorates, phosphates, carbonates, borates, phosphonates, sulfates, acetates, citrates, and perchlorates. Non-limiting examples of carbonates include sodium carbonates, potassium carbonates, lithium carbonates, barium carbonates, magnesium carbonates, calcium carbonates, ammonium carbonates, cobaltous carbonates, ferrous carbonates, lead carbonates, manganese carbonates, and nickel carbonates. Non-limiting examples of perchlorates include sodium perchlorate, potassium perchlorate, lithium perchlorate, barium perchlorate, magnesium perchlorate, calcium perchlorate, ammonium perchlorate, cobaltous perchlorate, ferrous perchlorate, lead perchlorate, manganese perchlorate, and nickel perchlorate. Non-limiting examples of chlorates include sodium chlorates, potassium chlorates, lithium chlorates, barium chlorates, magnesium chlorates, calcium chlorates, ammonium chlorates, cobaltous chlorates, ferrous chlorates, lead chlorates, manganese chlorates, and nickel chlorates. Non-limiting examples of phosphates include sodium phosphates, potassium phosphates, lithium phosphates, barium phosphates, magnesium phosphates, calcium phosphates, ammonium phosphates, cobaltous phosphates, ferrous phosphates, lead phosphates, manganese phosphates, and nickel phosphates. The antistatic agent may also be a sulfonimide or a sulfonamide.

The antistatic agent may be present in a composition in an amount ranging from about 0.01 wt. % to about 20 wt. % based upon the total weight percent of the composition. In an example, the antistatic agent may be present in a composition in an amount ranging from about 0.1 wt. % to about 15 wt. %, for example, from about 2 wt. % to about 13 wt. %, for example, about 4 wt. % based upon the total weight percent of the composition.

In some examples, the first antistatic agent, the second antistatic agent, and third antistatic agent can be thermally stable at a polymer melt processing temperature.

In some examples, the first antistatic agent, the second antistatic agent, and the third antistatic agent can be independently selected from the group consisting of $Li_2NiBr_4$, $Li_2CuCl_4$, $LiCuO$, $LiCu_4O(PO_4)_2$, $LiSOCl_2$, $LiSO_2Cl_2$, $LiSO_2$, $LiI_2$, $LiN_3$, $C_5H_5COOLi$, $LiBr$, $Li_2CO_3$, $LiCl$, $C_5H_{11}(CH_2)_3CO_2Li$, $LiBO_2$, $LiClO_4$, $Li_3PO_4$, $Li_2SO_4$, $Li_2B_4O_7$, $LiAlCl_4$, $AuCl_4Li$, $LiGaCl_4$, $LiBF_4$, $LiMnO_2$, $LiFeS_2$, $LiAg_2CrO_4$, $LiAg_2V_4O_{11}$, $LiSVO$, $LiCSVO$, $CF_3SO_3Li$, $LiPF_6$, $LiBF_4$, $LiClO_4$, $LiCuS$, $LiPbCuS$, $LiFeS$, $LiBi_2Pb_2O_5$, $LiBi_2O_3$, $LiV_2O_5$, $LiCoO_2$, $LiNiCoO_2$, $LiCuCl_2$, $Li/Al-V_2O_5$, lithium bis(oxalato)borate, $LiN(SO_2CF_3)_2$, $LiN(SOCF_2CF_3)_2$, $LiAsF_6$, $LiC(SO_2CF_3)_3$, $LiN(SO_2F)_2$, $LiN(SO_2F)(SO_2CF_3)$, $LiN(SO_2F)(SO_2C_4F_9)$, $LiOSO_2CF_3$, and combinations thereof.

In some examples, the first antistatic agent, the second antistatic agent, and the third antistatic agent can be independently selected from the group consisting of a salt of an alkali or alkaline earth metal selected from the group consisting of quaternary amines, chlorates, phosphates, carbonates, borates, phosphonates, sulfates, acetates, citrates, perchlorates, and combinations thereof.

In some examples, the first antistatic agent can be present in an amount of from about 0.1 wt. % to about 10 wt. % based upon a total weight of the first fusing agent, or in an amount of from about 0.5 wt. % to about 9 wt. % based upon a total weight of the first fusing agent, or in an amount of from about 1 wt. % to about 8 wt. % based upon a total weight of the first fusing agent, or in an amount of from about 2 wt. % to about 7 wt. % based upon a total weight of the first fusing agent, or in an amount of less than about 10 wt. % based upon a total weight of the first fusing agent, or in an amount of less than about 9 wt. % based upon a total weight of the first fusing agent, or in an amount of less than about 8 wt. % based upon a total weight of the first fusing agent, or in an amount of less than about 7 wt. % based upon a total weight of the first fusing agent, or in an amount of less than about 6 wt. % based upon a total weight of the first fusing agent, or in an amount of less than about 5 wt. % based upon a total weight of the first fusing agent, or in an amount of less than about 4 wt. % based upon a total weight of the first fusing agent, or in an amount of greater than about 0.1 wt. % based upon a total weight of the first fusing agent, or in an amount of greater than about 0.5 wt. % based upon a total weight of the first fusing agent, or in an amount of greater than about 1 wt. % based upon a total weight of the first fusing agent, or in an amount of greater than about 2 wt. % based upon a total weight of the first fusing agent, or in an amount of greater than about 3 wt. % based upon a total weight of the first fusing agent, or in an amount of greater than about 4 wt. % based upon a total weight of the first fusing agent, or in an amount of greater than about 5 wt. % based upon a total weight of the first fusing agent, or in an amount of greater than about 6 wt. % based upon a total weight of the first fusing agent, or in an amount of greater than about 7 wt. % based upon a total weight of the first fusing agent, or in an amount of greater than about 8 wt. % based upon a total weight of the first fusing agent, or in an amount of greater than about 9 wt. % based upon a total weight of the first fusing agent.

In some examples, the second antistatic agent is present in an amount of from about 0.01 wt. % to about 7 wt. % based upon a total weight of the first detailing agent, or in an amount of from about 0.1 wt. % to about 6 wt. % based upon a total weight of the first detailing agent, or in an amount of from about 1 wt. % to about 5 wt. % based upon a total weight of the first detailing agent, or in an amount of from about 2 wt. % to about 4 wt. % based upon a total weight of the first detailing agent, or in an amount of less than about 7 wt. % based upon a total weight of the first detailing agent, or in an amount of less than about 6 wt. % based upon a total weight of the first detailing agent, or in an amount of less than about 5 wt. % based upon a total weight of the first detailing agent, or in an amount of less than about 4 wt. % based upon a total weight of the first detailing agent, or in an amount of less than about 3 wt. % based upon a total weight of the first detailing agent, or in an amount of less than about 2 wt. % based upon a total weight of the first detailing agent, or in an amount of less than about 1 wt. % based upon a total weight of the first detailing agent, or in an amount of greater than about 0.01 wt. % based upon a total weight of the first detailing agent, or in an amount of greater than about 0.1 wt. % based upon a total weight of the first detailing agent, or in an amount of greater than about 1 wt. % based upon a total weight of the first detailing agent, or in an amount of greater than about 2 wt. % based upon a total weight of the first detailing agent, or in an amount of greater than about 3 wt. % based upon a total weight of the first detailing agent, or in an amount of greater than about 4 wt. % based upon a total weight of the first detailing agent, or in an amount of greater than about 5 wt. % based upon a total weight of the first detailing agent, or in an amount of greater than about 6 wt. % based upon a total weight of the first detailing agent.

In some examples, the third antistatic agent is present in an amount of from about 0.01 wt. % to about 7 wt. % based upon a total weight of the second detailing agent, or in an amount of from about 0.1 wt % to about 6 wt. % based upon a total weight of the second detailing agent, or in an amount of from about 1 wt. % to about 5 wt. % based upon a total weight of the second detailing agent, or in an amount of from about 2 wt. % to about 4 wt. % based upon a total weight of the second detailing agent, or in an amount of less than about 7 wt. % based upon a total weight of the second detailing agent, or in an amount of less than about 6 wt. % based upon a total weight of the second detailing agent, or in an amount of less than about 5 wt. % based upon a total weight of the second detailing agent, or in an amount of less than about 4 wt. % based upon a total weight of the second detailing agent, or in an amount of less than about 3 wt. % based upon a total weight of the second detailing agent, or in an amount of less than about 2 wt. % based upon a total weight of the second detailing agent, or in an amount of less than about 1 wt. % based upon a total weight of the second detailing agent, or in an amount of greater than about 0.01 wt. % based upon a total weight of the second detailing agent, or in an amount of greater than about 0.1 wt. % based upon a total weight of the second detailing agent, or in an amount of greater than about 1 wt. % based upon a total weight of the second detailing agent, or in an amount of greater than about 2 wt. % based upon a total weight of the second detailing agent, or in an amount of greater than about 3 wt. % based upon a total weight of the second detailing agent, or in an amount of greater than about 4 wt. % based upon a total weight of the second detailing agent, or in an amount of greater than about 5 wt. % based upon a total weight of the second detailing agent, or in an amount of greater than about 6 wt. % based upon a total weight of the second detailing agent.

Binders

In some examples, the three-dimensional printing compositions and/or fusing/detailing agents, described herein, may further include other suitable binders, for example, chemical binders, such as metal salts, sugars, sugar alcohols, polymeric or oligomeric sugars, low or moderate molecular weight polycarboxylic acids, polysulfonic acids, water soluble polymers containing carboxylic or sulfonic moieties, and polyether alkoxy silane. Some specific examples include glucose ($C_6H_{12}O_6$), sucrose ($C_{12}H_{22}O_{11}$), fructose ($C_6H_{12}O_6$), maltodextrines with a chain length ranging from 2 units to 20 units, sorbitol ($C_6H_{14}O_6$), erythritol ($C_4H_{10}O_4$), mannitol ($C_6H_{14}O_6$), or a short chain polyacrylic acid.

Other suitable binders that may be used include water-dispersible or water soluble polymers. Examples of polymer classes include acrylics, styrenics, polyethylenes, polypropylenes, polyesters, polyamides, polyurethanes, polyureas, polyethers, polycarbonates, polyacid anhydrides, and copolymers and/or combinations thereof. Such polymer particles may be ionomeric, film-forming, non-film-forming, fusible, or heavily crosslinked, and may have a wide range of molecular weights and glass transition temperatures.

In some examples, the three-dimensional printing compositions and/or fusing/detailing agents, described herein, can include at least one binder. In some examples, this binder can be a part of the polymeric dispersion described above and/or added to the solvent system directly.

In some examples, the binder can comprise a polyurethane polymer, which can improve the durability of the ink composition. In some examples, the polyurethane polymer can act as a binder to help bind the pigment particles together.

In some examples, the polyurethane can be a reaction product of a polyisocyanate having at least two isocyanate (—NCO) functionalities per molecule with, at least, one isocyanate-reactive group, such as a polyol, having at least two hydroxy groups or an amine. Suitable polyisocyanates can include diisocyanate monomers and oligomers.

In some examples, the polyurethane can be a vinyl-urethane hybrid polymer or an acrylic-urethane hybrid polymer. In still other examples, the polyurethane can be an aliphatic polyurethane-acrylic hybrid polymer.

In some examples, the polyurethane can include a modified or unmodified polymeric core of either polyurethane or a copolymer that includes polyurethane. Suitable polyurethanes can include aliphatic as well as aromatic polyurethanes.

In another example, the polyurethane can include an aromatic polyether polyurethane, an aliphatic polyether polyurethane, an aromatic polyester polyurethane, an aliphatic polyester polyurethane, an aromatic polycaprolactam polyurethane, an aliphatic polycaprolactam polyurethane, or a combination thereof. In a more specific example, the polyurethane can include an aromatic polyether polyurethane, an aliphatic polyether polyurethane, an aromatic polyester polyurethane, an aliphatic polyester polyurethane, and a combination thereof.

In some examples, the three-dimensional printing compositions and/or fusing/detailing agents, described herein, may include the binder in an amount of from about 0.5 wt % to about 20 wt % based on the total weight of the compositions and/or agents, or from about 1 wt % to about 10 wt %, or from about 2 wt % to about 8 wt %, or from about 3 wt % to about 7 wt %.

Colorants

The colorant may be, for example, a pigment and/or dye. The colorant may have any color (e.g., cyan, magenta, yellow, white, etc.). Some examples of a colorant include a set of cyan, magenta, and yellow, such as C1893A (cyan), C1984A (magenta), and C1985A (yellow); or C4801A (cyan), C4802A (magenta), and C4803A (yellow); all of which are available from Hewlett-Packard Company. Other commercially available colorants include C9384A (printhead HP 72), C9383A (printhead HP 72), C4901A (printhead HP 940), and C4900A (printhead HP 940).

Some examples of a white colorant include pigments, such as titanium dioxide (TiO2), zinc oxide (ZnO), calcium carbonate (CaCO3), barium sulfate (BaSO4), or combinations thereof. The colorant may, in some instances, be dispersed with a dispersing additive. As such, the dispersing additive helps to uniformly distribute the colorant throughout the agent. The dispersing additive may be present in the agent in an amount ranging from about 0.01 wt. % to about 1 wt. % based on the total wt. % of the colorant. Some examples of the dispersing additive include a water soluble acrylic acid polymer, a high molecular weight block copolymer with pigment affinic groups, and combinations thereof.

In some examples, the three-dimensional printing compositions, fusing agents, and/or detailing agents, described herein, may further include a colorant. The colorant can be present in the composition/agent can impart color to the resulting 3D part.

The colorant may be a pigment and/or dye having any suitable color. Examples of the colors include cyan, magenta, yellow, or combinations thereof.

Examples of colorants include dyes, such as Acid Yellow 23 (AY 23), Acid Yellow 17 (AY 17), Acid Red 52 (AR 52), Acid Red 289 (AR 289), Reactive Red 180 (RR 180), Direct Blue 199 (DB 199), or pigments, such as Pigment Blue 15:3 (PB 15:3), Pigment Red 122 (PR 122), Pigment Yellow 155 (PY 155), and Pigment Yellow 74 (PY 74).

Any standard color pigments may be used, such as phthalocyanines for blue, quinacridone for magenta or red, pigment yellow for yellow, white, black, or combinations thereof. Some commercially available examples of the white colorant are available from DuPont under the tradename TI-PURE®, an example of which includes TI-PURE® R-706.

In some examples, dyes can be used. Examples include acid dyes (e.g., Acid Red 52, Acid Red 289, Acid Yellow 23, Acid Yellow 17, or combinations thereof), reactive dyes (e.g., Reactive Red 180, Reactive Black 31, or combinations thereof), and phthalocyanine dyes (e.g., Direct Blue 199 and Pro-Jet Cyan dyes available from Fujifilm Industrial Colorants).

Some examples of the colorant(s) can include a set of cyan, magenta, and yellow inks, such as C1893A (cyan), C1984A (magenta), and C1985A (yellow); or C4801A (cyan), C4802A (magenta), and C4803A (yellow); all of which are available from Hewlett-Packard Company.

In some examples, a colored ink can include a colorant (as described above), a solvent, a surfactant, and water. In some examples, colored ink can include further additives.

In some examples, the colored ink(s) can include a pigment, which imparts color to the build material upon application. The pigment may be a self-dispersing pigment or the soft polymer precursor may act as a suitable dispersant for dispersing the pigment throughout the composition. In some examples, the colored ink(s) can include a colorant (e.g., pigment and/or dye) having a color including white or black. Examples of colors include cyan, magenta, yellow, white, black, or mixtures thereof.

The amount of the colorant that may be present in the three-dimensional printing compositions and/or agents ranges from about 0.1 wt % to about 20 wt % based on the total weight of the compositions and/or agents. In some examples, the amount of the colorant that may be present in the compositions and/or agents ranges from about 1 wt % to about 15 wt % based on the total weight of the compositions and/or agents. In some examples, the amount of the colorant that may be present in the compositions and/or agents ranges from about 1 wt % to about 10 wt % based on the total weight of the compositions and/or agents.

Surfactants

Surfactant(s) may be used to improve the wetting properties and the jettability of the agent. Examples of suitable surfactants may include a self-emulsifiable, nonionic wetting agent based on acetylenic diol chemistry, a nonionic fluorosurfactant, and combinations thereof. In other examples, the surfactant may be an ethoxylated low-foam wetting agent or an ethoxylated wetting agent and molecular defoamer. Still other suitable surfactants include non-ionic wetting agents and molecular defoamers or water-soluble, non-ionic surfactants. In some examples, it may be desirable to utilize a surfactant having a hydrophilic-lipophilic balance (HLB) less than 10. Whether a single surfactant is used or a combination of surfactants is used, the total amount of surfactant(s) in the agent may range from about 0.1 wt % to about 3 wt % based on the total wt % of the agent.

In some examples, the other surfactants can include wetting agent(s) and/or surface tension reducing agent(s).

Examples of suitable wetting agents can include non-ionic surfactants. Some specific examples include a self-emulsifiable, non-ionic wetting agent based on acetylenic diol chemistry (e.g., SURFYNOL® SEF from Air Products and Chemicals, Inc.), a non-ionic fluorosurfactant (e.g., CAPSTONE® fluorosurfactants from DuPont, previously referred as ZONYL FSO), and combinations thereof. In other examples, the wetting agent is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable wetting agents include non-ionic wetting agents and molecular defoamers (e.g., SURFYNOL® 104E from Air Products and Chemical Inc.) or water-soluble, non-ionic surfactants (e.g., TERGITOL™ TMN-6, TERGITOL™ 15S7, and TERGITOL™ 15S9 from The Dow Chemical Company). In some examples, an anionic surfactant may be used in combination with the non-ionic surfactant. In some examples, it may be appropriate to utilize a wetting agent having a hydrophilic-lipophilic balance (HLB) less than 10.

In some examples, wetting agent(s) may be present in the fusing agent(s) and/or detailing agent(s) in an amount ranging from about 0.1 wt % to about 4 wt % of the total weight of the compositions/agents. In an example, the amount of the wetting agent(s) present in the compositions/agents is about 0.1 wt % based on the total weight of the compositions/agents. In another example, the amount of the wetting agent(s) present in the compositions/agents is about 0.04 wt % based on the total weight of the compositions/agents.

The fusing agent(s) and/or detailing agent(s) may also include surface tension reduction agent(s). Any of the previously mentioned wetting agents/surfactants may be used to reduce the surface tension. As an example, the surface tension reduction agent may be the self-emulsifiable, non-ionic wetting agent based on acetylenic diol chemistry (e.g., SURFYNOLO® SEF from Air Products and Chemicals, Inc.).

The surface tension reduction agent(s) may be present in the compositions/agents in an amount ranging from about 0.1 wt % to about 4 wt % of the total weight of the compositions/agents. In an example, the amount of the surface tension reduction agent(s) present in the compositions/agents is about 1.5 wt % based on the total weight of the compositions/agents. In another example, the amount of the surface tension reduction agent(s) present in the compositions/agents is about 0.6 wt % compositions/agents.

When a surfactant is both a wetting agent and a surface tension reduction agent, any of the ranges presented herein for the wetting agent and the surface tension reduction agent may be used for the surfactant.

Co-Solvents

Some examples of a co-solvent include 1-(2-hydroxyethyl)-2-pyrollidinone, 2-Pyrrolidinone, 1,5-Pentanediol, Triethylene glycol, Tetraethylene glycol, 2-methyl-1,3-propanediol, dipropylene glycol methyl ether, tripropylene glycol butyl ether, dipropylene glycol butyl ether, triethylene glycol butyl ether, 1,6-Hexanediol, Tripropylene glycol methyl ether, N-methylpyrrolidone, Ethoxylated Glycerol-1 (LEG-1), 1,2-hexanediol, and combinations thereof.

The co-solvent may be present in an amount ranging from about 10 wt. % to about 30 wt. % based on the total wt. % of the agent.

In some examples, the co-solvent can include 1-methyl-2-pyrrolidone (1M2P), 2-pyrrolidone, 1-(2-hydroxyethyl)-2-pyrrolidone, dimethylformamide (DMF), dimethyl sulfoxide (DMSO), and combinations thereof.

Biocides

Examples of suitable biocides include an aqueous solution of 1,2-benzisothiazolin-3-one, quaternary ammonium compounds, and an aqueous solution of methylisothiazolone. Whether a single biocide is used or a combination of biocides is used, the total amount of biocide(s) in the fusing agent(s) and/or detailing agent(s) may range from about 0.1 wt % to about 1 wt % with respect to the total wt % of the agent(s).

Anti-Kogation Agents

Non-limiting examples of suitable anti-kogation agents include oleth-3-phosphate or polyoxyethylene (3) oleyl mono/di-phosphate, a metal chelator/chelating agent, such as methylglycinediacetic acid, and combinations thereof.

Liquid Vehicle

The fusing agents and/or detailing agents disclosed herein can include a liquid vehicle. Liquid vehicle(s), as described herein, can include solvent(s)/co-solvent(s) described hereinabove and solvent(s) other than the solvent(s)/co-solvents described hereinabove. The liquid vehicle(s), as described herein, can generally include solvent(s) in which a near infrared absorbing agent and/or antistatic agent can be added to form the fusing agent and/or detailing agent.

Examples of liquid vehicles can include water, alone or in combination with a mixture of a variety of additional components. Examples of these additional components may include water soluble co-solvent(s), wetting agent(s), surface tension reduction agent(s), emulsifier(s), scale inhibitor(s), anti-deceleration agent(s), chelating agent(s), and/or antimicrobial agent(s).

In some examples, the liquid vehicle can be present in the fusing agent and/or detailing agent in an amount of from about 1 wt % to about 95 wt % based on the total weight of the fusing agent and/or detailing agent (agent(s)). In some examples, the liquid vehicle can be present in the agent in an amount of from about 5 wt % to about 95 wt % based on the total weight of the agent. In some examples, the liquid vehicle can be present in the agent in an amount of from about 10 wt % to about 70 wt % based on the total weight of the agent. In some examples, the liquid vehicle can be present in the agent in an amount of from about 20 wt % to about 60 wt % based on the total weight of the agent. In some examples, the liquid vehicle can be present in the agent in an amount of from about 50 wt % to about 95 wt % based on the total weight of the agent. In some examples, the liquid vehicle can be present in the agent in an amount of from about 60 wt % to about 85 wt % based on the total weight of the agent.

The co-solvent can be present in the liquid vehicle in an amount ranging from about 0.1 wt % to about 20 wt % based on the total weight of the liquid vehicle.

Some examples of co-solvents can include 2-pyrrolidinone, hydroxyethyl-2-pyrrolidone, diethylene glycol, 2-methyl-1,3-propanediol, tetraethylene glycol, tripropylene glycol methyl ether, dipropylene glycol methyl ether, tripropylene glycol butyl ether, dipropylene glycol butyl ether, triethylene glycol butyl ether, 1,2-hexanediol, 2-hydroxyethyl pyrrolidinone, 2-hydroxyethyl-2-pyrrolidinone, 1,6-hexanediol, and combinations thereof.

The aqueous nature of the agents can enable them to penetrate, at least partially, into the layer of the polymeric or polymeric composite build material particles. The build material particles may be hydrophobic, and the presence of the wetting agent(s) in the compositions/agents may assist in obtaining a particular wetting behavior.

In some examples, water can be present in the agent(s) in amounts greater than about 30 wt % based on the total weight of the agent(s). In some examples, the water can be present in the agent(s) in amounts from about 40 wt % to about 90 wt % based on the total weight of the agent(s). In other examples, the agent(s) can include from about 45 wt % to about 80 wt % water based on the total weight of the agent(s). In further examples, the agent(s) can include from about 50 wt % to about 70 wt % water based on the total weight of the agent(s).

The liquid vehicle may also include water soluble organic solvent(s). In some examples, the water soluble organic solvent(s) may be the same type of solvent as the solvent(s)/co-solvent(s) described hereinabove. In these examples, the water soluble organic solvent(s) may be 1-methyl-2-pyrrolidone (1M2P), 2-pyrrolidone, 1-(2-hydroxyethyl)-2-pyrrolidone, dimethylformamide (DMF), dimethyl sulfoxide (DMSO), or a combination thereof. In other examples, the water soluble organic solvent(s) may be different than the solvent(s)/co-solvent(s) described hereinabove. For example, two different solvent(s)/co-solvent(s) may be selected. For another example, the water soluble organic solvent(s) may be 1,5-pentanediol, triethylene glycol, tetraethylene glycol, 2-methyl-1,3-propanediol, 1,6-hexanediol, tripropylene glycol methyl ether, or a combination thereof.

The water soluble organic solvent(s) may be present in the agent(s) in an amount ranging from about 2 wt % to about 80 wt % of the total weight of the agent(s). In an example, the amount of the water soluble organic solvent(s) present in the agent(s) is greater than about 30 wt % based on the total weight of the agent(s), or the amount of the water soluble organic solvent(s) present in the agent(s) is greater than about 40 wt % based on the total weight of the agent(s), or the amount of the water soluble organic solvent(s) present in the agent(s) is greater than about 50 wt % based on the total weight of the agent(s), or the amount of the water soluble organic solvent(s) present in the agent(s) is greater than about 60 wt % on the total weight of the agent(s), or the amount of the water soluble organic solvent(s) present in the agent(s) is greater than about 70 wt % based on the total weight of the agent(s), or the amount of the water soluble organic solvent(s) present in the agent(s) is greater than about 80 wt % based on the total weight of the agent(s), or the amount of the water soluble organic solvent(s) present in the agent(s) is greater than about 85 wt % based on the total weight of the agent(s), or the amount of the water soluble organic solvent(s) present in the agent(s) is greater than about 90 wt % based on the total weight of the agent(s).

The liquid vehicle may also include emulsifier(s). Examples of suitable emulsifiers include oleth-3-phosphate (commercially available as CRODAFOS™ O3A or CRODAFOS™ N-3 acid) or dextran 500 k. Other suitable examples of the emulsifiers include CRODAFOS™ HCE (phosphate-ester from Croda Int.), CRODAFOS® N10 (oleth-10-phosphate from Croda Int.).

The emulsifier(s) may be present in the agent(s) in an amount ranging from about 0.1 wt % to about 5 wt % of the total weight of the agent(s). In an example, the amount of the emulsifier(s) present in the agent(s) is less than about 3 wt % based on the total weight of the agent(s). In another example, the amount of the emulsifier(s) present in the agent(s) is less than about 2 wt % based on the total weight of the agent(s).

The liquid vehicle may further include scale inhibitor(s) or anti-deceleration agent(s). One suitable scale inhibitor/anti-deceleration agent is an alkyldiphenyloxide disulfonate (e.g., DOWFAX™ 8390 and DOWFAX™ 2A1 from The Dow Chemical Company).

The scale inhibitor(s)/anti-deceleration agent(s) may be present in the agent(s) in an amount ranging from about 0.05 wt % to about 5 wt % of the total weight of the agent(s). In an example, the scale inhibitor(s)/anti-deceleration agent(s) is/are present in the agent(s) in an amount of about 0.25 wt % based on the total weight of the agent(s). In another example, the scale inhibitor(s)/anti-deceleration agent(s) is/are present in the agent(s) in an amount of about 0.1 wt % based on the total weight of the agent(s).

The liquid vehicle may also include chelating agent(s). The chelating agent may be included to eliminate the deleterious effects of any heavy metal impurities. Examples of suitable chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the agent(s) may range from 0 wt % to about 2 wt % based on the total weight of the agent(s). In an example, the chelating agent is present in the agent(s) in an amount of from about 0.01 wt % to about 1 wt % based on the total weight of the agent(s).

The liquid vehicle may also include antimicrobial agent(s). Suitable antimicrobial agents include biocides and fungicides. Example antimicrobial agents may include the NUOSEPT® (Ashland Inc.), UCARCIDE™ or KORDEK™ (Dow Chemical Co.), and PROXEL® (Arch Chemicals) series, ACTICIDE® M20 (Thor), and combinations thereof.

In an example, the liquid vehicle may include a total amount of antimicrobial agents that ranges from about 0.05 wt % to about 0.5 wt % based on the total weight of the fusing and/or detailing agent.

Method(s) of Making Fusing/Detailing Agent(s)

Also disclosed herein is a method of making the fusing agent(s) and/or the detailing agent(s). In some examples, the agents can be made by a method comprising: mixing a near infrared absorbing agent and/or antistatic agent with solvent, water, and an additive selected from the group consisting of an emulsifier, a surface tension reduction agent, a wetting agent, a scale inhibitor, an anti-deceleration agent, a chelating agent, an antimicrobial agent, and a combination thereof.

The above mixing can include stirring, shaking, grinding, milling, and combinations thereof to form a substantially homogeneous mixture of the compositions/agents.

3D Printing Method(s)

The 3D printer 100 is depicted in FIG. 1 as including a build area platform 102, a build material supply 104 containing the build material 106, and a spreader 108. The build area platform 102 may be integrated with the 3D printer 100 or may be a component that is separately insertable into the 3D printer 100, e.g., the build area platform 102 may be a module that is available separately from the 3D printer 100. The build material supply 104 may be a container or surface that is to position the build material 106 between the spreader 108 and the build area platform 102. The build material supply 104 may be a hopper or a surface upon which the build material 106 may be supplied. The spreader 108 may be moved in a direction as denoted by the arrow 110, e.g., along the y-axis, over the build material supply 104 and across the build area platform 102 to spread a layer of the build material 106 over a surface of the build area platform 102.

In one example, a printhead may selectively apply a fusing agent over a select area of a layer of the build material 106 to form a core 10 of a 3D printed part 40. Then an inner shell 20 of a 3D printed part 40 can be formed by selectively applying a second fusing agent and a first detailing agent at least over a portion of the core 10. The external shell 30 can be formed over at least a portion of the inner shell 20 by selectively applying a second detailing agent on the inner shell 20. The first fusing agent, the second fusing agent, the first detailing agent, and the second detailing agent can be applied using one or more printheads.

In some examples, the core 10 comprises an antistatic agent but the inner shell 20 and the external shell 30 are free of the antistatic agent. In some examples, the core comprises an antistatic agent and the inner shell 20 and the external shell 30 also include antistatic agents, which can be the same as or different from the antistatic agent in the core 10. In some examples, the core 10 comprises an antistatic agent and only one of either the inner shell 20 or the external shell 30 includes an antistatic agent, which can be the same as or different from the antistatic agent in the core 10.

In some examples, the core 10 further comprises a near infrared absorbing compound but the inner shell 20 and the external shell 30 are free of any near infrared absorbing compound. In some examples, the core 10 further comprises a near infrared absorbing compound and the inner shell 20 includes a near infrared absorbing compound but the external shell 30 does not include any near infrared absorbing compound, wherein the near infrared absorbing compounds in the core 10 and in the inner shell 20 can be the same or different. In some examples, the core 10 further comprises a near infrared absorbing compound and the inner shell 20 and the external shell 30 include a near infrared absorbing compound, wherein the near infrared absorbing compounds in the core 10, the inner shell 20, and the external shell 30, can be all the same or all different or have two the same with one different.

In an example, the inner shell 20 may have a thickness ranging from about 0 mm to about 5 mm, for example, from about 0.2 mm to about 1.5 mm, and as a further example, from about 0.5 mm to about 1 mm. In an example, the external shell 30 may have a thickness ranging from about 0 mm to about 5 mm, for example, from about 0.2 mm to about 1.5 mm, and as a further example, from about 0.5 mm to about 1 mm.

The 3D printer 100 is further depicted as including a printhead 130 that may be scanned across the build area platform 102 in the direction indicated by the arrow 132, e.g., along the y-axis. The printhead 130 may be, for instance, a thermal inkjet printhead or a piezoelectric printhead, and may extend a width of the build area platform 102. Although a single printhead 130 has been depicted in FIG. 1, it should be understood that multiple printheads may be used that span the width of the build area platform 102. Additionally, the printheads 130 may be positioned in multiple printbars. The printhead 130 may also deposit an agent, such as a fusing agent, a detailing agent, and/or an antistatic agent, over a selected area of a layer of the build material 106. In an example, multiple printheads 130 may independently deposit the same or different agent over a selected area of a layer of the build material 106. In an example, the multiple printheads 130 may simultaneously or sequentially deposit the same or different agents over a selected area of a layer of the build material 106.

In some examples, layer(s) of the build material comprising at least one polymer (see various options described hereinabove) can be applied or deposited in a fabrication bed of a 3D printer. The applied layer(s) can be exposed to heating, which can be performed to pre-heat the build material. Thus, the heating temperature may be below the melting point of the build material. As such, the temperature selected can depend upon the build material that is used. As examples, the heating temperature may be from about 5° C. to about 50° C. below the melting point of the build material. In an example, the heating temperature can range from about 50° C. to about 400° C. In another example, the heating temperature can range from about 150° C. to about 170° C.

Pre-heating the layer(s) of the build material may be accomplished using any suitable heat source that exposes all of the build material to the heat. Examples of the heat source can include a thermal heat source or an electromagnetic radiation source (e.g., infrared (IR), microwave, or combination thereof).

After pre-heating the layer(s) of the build material, the fusing agent(s) can be selectively applied on at least a portion of the build material in the layer(s). The fusing agent(s) described herein can be dispensed from an inkjet printhead, such as a thermal inkjet printhead or a piezoelectric inkjet printhead. The printhead can be a drop-on-demand printhead or a continuous drop printhead.

The printhead may include an array of nozzles through which drops of the compositions/agents described herein can be ejected. In some examples, printhead can deliver variable size drops of the compositions/agents.

Before or after selectively applying the fusing agent(s) described herein on the portion(s) of the build material, colored ink(s) can be applied to portion(s) of the build material. After the compositions/agents and in some instances the colored ink(s) are selectively applied in the specific portions of the layer(s) of the build material, the entire object(s) or part(s) is exposed to infrared radiation.

The infrared radiation can be emitted from a radiation source, such as an IR (e.g., near-IR) curing lamp, or IR (e.g., near-IR) light emitting diodes (LED), or lasers with specific IR or near-IR wavelengths. Any radiation source may be used that emits a wavelength in the infrared spectrum, for example near-infrared spectrum. The radiation source may be attached, for example, to a carriage that also holds the printhead(s). The carriage may move the radiation source into a position that is adjacent to the fabrication bed containing the 3D printed object(s) or part(s). The radiation source may be programmed to receive commands from a central processing unit and to expose the layer(s) of the build material including the compositions/agents to the infrared radiation.

The length of time the radiation is applied for, or energy exposure time, may be dependent, for example, on characteristics of the radiation source, characteristics of the build material, and/or characteristics of the compositions/agents.

The fusing agent(s) described herein can enhance the absorption of the radiation, convert the absorbed radiation to thermal energy, and promote the transfer of the thermal heat to the build material in contact therewith. In an example, the fusing agent(s) can sufficiently elevate the temperature of the build material above the melting point(s), allowing curing (e.g., sintering, binding, or fusing) of the build material particles to take place.

In some examples, portions of the build material that do not have the fusing agent(s) applied thereto do not absorb enough energy to fuse. However, the generated thermal energy may propagate into the surrounding build material that does not have the fusing agent(s) applied thereto. The propagation of thermal energy may cause at least some of the build material sans fusing agent to partially fuse.

Exposure to radiation can complete the formation of the core of 3D printed object(s) or part(s).

The same or different printhead(s) can be used to form an inner shell and then an external shell by selectively applying detailing agents, as discussed above.

In some examples, the completed 3D printed object(s) or part(s) may be removed from the fabrication bed and any uncured build material may be removed from the 3D part(s) or object(s).

In some examples, the unfused build material may be washed and then reused.

As shown in FIG. 3, a method of three-dimensional printing 300 can comprise: (i) depositing a layer of build material 302; (ii) selectively applying a first fusing agent on the build material 304, wherein the first fusing agent comprises at least one first antistatic agent; and (iii) repeating (i) and (ii) at least once 306 to form a core of a three-dimensional part 308.

The method can, in some examples, further comprise: (iv) applying a second fusing agent and a first detailing agent on the core of the three-dimensional part to form an inner shell at least partially enclosing the core, wherein the first detailing agent comprises at least one second antistatic agent; and (v) applying a second detailing agent on the inner shell, wherein the second detailing agent is free of any near infrared absorbing compound.

The second fusing agent further comprises at least one second near infrared absorbing compound; and the second detailing agent further comprises at least one third antistatic agent.

In some examples, the first antistatic agent, the second antistatic agent, and the third antistatic agent are different; and the first near infrared absorbing compound and the second near infrared absorbing compound are different.

The first antistatic agent, the second antistatic agent, and the third antistatic agent are the same, and the first antistatic agent, the second antistatic agent, and the third antistatic agent are independently selected from the group consisting of $Li_2NiBr_4$, $Li_2CuCl_4$, $LiCuO$, $LiCu_4O(PO_4)_2$, $LiSOCl_2$, $LiSO_2Cl_2$, $LiSO_2$, $LiI_2$, $LiN_3$, $C_6H_5COOLi$, $LiBr$, $Li_2CO_3$, $LiCl$, $C_6H_{11}(CH_2)_3CO_2Li$, $LiBO_2$, $Li_3PO_4$, $Li_2SO_4$, $Li_2B_4O_7$, $LiAlCl_4$, $AuCl_4Li$, $LiGaCl_4$, $LiBF_4$, $LiMnO_2$, $LiFeS_2$, $LiAg_2CrO_4$, $LiAg_2V_4O_{11}$, $LiSVO$, $LiCSVO$, $CF_3SO_3Li$, $LiCuS$, $LiPbCuS$, $LiFeS$, $LiBi_2Pb_2O_5$, $LiBi_2O_3$, $LiV_2O_5$, $LiCoO_2$, $LiNiCoO_2$, $LiCuCl_2$, $Li/Al—V_2O_5$, lithium bis(oxalato)borate, $LiN(SO_2CF_3)_2$, $LiN(SOCF_2CF_3)_2$, $LiAsF_6$, $LiC(SO_2CF_3)_3$, $LiN(SO_2F)_2$, $LiN(SO_2F)(SO_2CF_3)$, $LiN(SO_2F)(SO_2C_4F_6)$, $LiOSO_2CF_3$, and combinations thereof; the first antistatic agent, the second antistatic agent, and the third antistatic agent are independently selected from the group consisting of a salt of an alkali or alkaline earth metal selected from the group consisting of quaternary amines, chlorates, phosphates, carbonates, borates, phosphonates, sulfates, acetates, citrates, perchlorates, and combinations thereof.

The first antistatic agent is present in an amount of from about 0.1 wt. % to about 10 wt. % based upon a total weight of the first fusing agent; the second antistatic agent is present in an amount of from about 0.01 wt. % to about 7 wt. % based upon a total weight of the first detailing agent; and the third antistatic agent is present in an amount of from about 0.01 wt. % to about 7 wt. % based upon a total weight of the second detailing agent.

The first fusing agent further comprises water, at least one organic solvent, at least one surfactant, and at least one biocide.

As shown in FIG. 4, a method of three-dimensional printing 400 can comprise: (i) depositing a layer of build material 402; (ii) selectively applying a first fusing agent comprising: at least one antistatic agent on the build material, at least one first near infrared absorbing compound, at least one surfactant, at least one organic solvent, and water 404; (iii) repeating (i) and (ii) at least once to form a core of a three-dimensional part 406; (iv) applying a second fusing agent and a first detailing agent on the core of the three-dimensional part to form an inner shell at least partially enclosing the core 408, wherein the second fusing agent comprises at least one second near infrared absorbing compound, and wherein the first detailing agent is free of any antistatic agent; and (v) applying a second detailing agent on the inner shell to at least partially enclose the inner shell and form an external shell 410, wherein the second detailing agent is free of (a) any near infrared absorbing compound and (b) any antistatic agent.

Unless otherwise stated, any feature described hereinabove can be combined with any example or any other feature described herein.

In describing and claiming the examples disclosed herein, the singular forms "a," "an," and "the" include plural referents unless the context clearly dictates otherwise.

It is to be understood that concentrations, amounts, and other numerical data may be expressed or presented herein in range formats. It is to be understood that such range formats are used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same applies to ranges reciting a single numerical value.

Reference throughout the specification to "one example," "some examples," "another example," "an example," and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

Unless otherwise stated, references herein to "wt %" of a component are to the weight of that component as a percentage of the whole composition comprising that component. For example, references herein to "wt %" of, for example, a solid material such as polyurethane(s) or colorant(s) dispersed in a liquid composition are to the weight percentage of those solids in the composition, and not to the amount of that solid as a percentage of the total non-volatile solids of the composition.

If a standard test is mentioned herein, unless otherwise stated, the version of the test to be referred to is the most recent at the time of filing this patent application.

All amounts disclosed herein and in the examples below are in wt % unless indicated otherwise.

To further illustrate the present disclosure, examples are given herein. It is to be understood that these examples are provided for illustrative reasons and are not to be construed as limiting the scope of the present disclosure.

EXAMPLES

Example 1

A fusing agent was prepared using the formulation shown in Table 1 below:

TABLE 1

| | Wt. % |
|---|---|
| Carbon Black (90 nm particle size) | 5 |
| Styrene Acrylic Polymeric Stabilizer | 2.5 |
| 2-Pyrrolidinone | 19 |
| Triethylene glycol | 8 |
| TEGO ® Wet 510 | 0.75 |
| CRODAFOS ® 03A | 0.45 |
| Trilon ® M (aqueous solution of the trisodium salt of methylglycinediacetic acid) | 0.08 |
| Acticide ® B20 | 0.18 |
| Acticide ® M20 | 0.14 |
| lithium bis-trifluoromethanesulfonimide (HQ-115) | 1.0 |
| Water | Balance |

The fusing agent including an antistatic agent (lithium bis-trifluoromethanesulfonimide) and a near infrared absorbing compound (carbon black) was used in a three-dimensional printer using a polyether block amide. The fusing agent was printed throughout the entire volume of the core only.

The resistivity of the printed part was measured with an ohmmeter (V=100 volts, DC). Each three-dimensional printed part was squeezed between two conductive electrodes and conductive rubber pads. Each part was measured three times, in different locations, and the values averaged.

Figure 5:
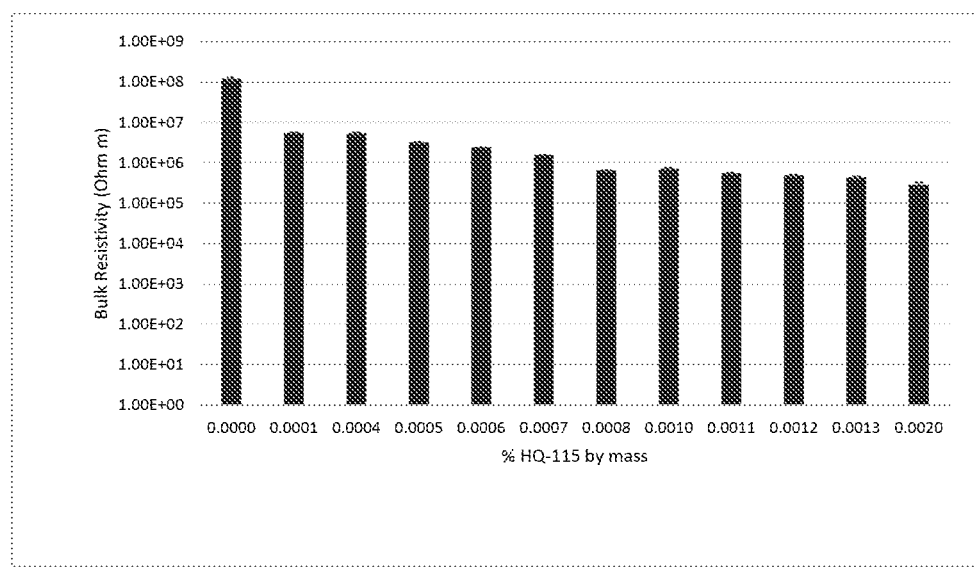
FIG. 5 is an example graph showing bulk resistivity per amount of antistatic agent.

Two sets of cubes (10 mm3) were printed with the polyether block amide. Within each set increasing amounts of the agent of the formulation described above were used (ranging from 0.00% to 0.60% solids). As can be seen from the data in FIG. 5, the increasing amounts of agent present in the three-dimensional part decreased the bulk resistivity of the three-dimensional part.

Example 2

A first fusing agent was prepared using the formulation shown in Table 2 below:

TABLE 2

| | Wt. % |
|---|---|
| Carbon Black (90 nm particle size) | 5 |
| Styrene Acrylic Polymeric Stabilizer | 2.5 |
| 2-Pyrrolidinone | 19 |
| Triethylene glycol | 8 |
| TEGO ® Wet 510 | 0.75 |
| CRODAFOS ® 03A | 0.45 |
| Trilon ® M (aqueous solution of the trisodium salt of methylglycinediacetic acid) | 0.08 |
| Acticide ® B20 | 0.18 |
| Acticide ® M20 | 0.14 |
| lithium bis-trifluoromethanesulfonimide (HQ-115) | 1.0 |
| Water | Balance |

A second fusing agent was prepared using the formulation shown in Table 3 below:

TABLE 3

| | Wt. % |
|---|---|
| Carbon Black (90 nm particle size) | 5 |
| Styrene Acrylic Polymeric Stabilizer | 2.5 |
| 2-Pyrrolidinone | 19 |
| Triethylene glycol | 8 |
| TEGO ® Wet 510 | 0.75 |
| CRODAFOS ® 03A | 0.45 |
| Trilon ® M (aqueous solution of the trisodium salt of methylglycinediacetic acid) | 0.08 |
| Acticide ® B20 | 0.18 |
| Acticide ® M20 | 0.14 |
| lithium bis-trifluoromethanesulfonimide (HQ-115) | 1.0 |
| Water | Balance |

A detailing agent was prepared using the formulation shown in Table 4 below:

TABLE 4

| | Wt. % |
|---|---|
| 2-Pyrrolidinone | 19 |
| Triethylene glycol | 8 |
| TEGO ® Wet 510 | 0.75 |
| CRODAFOS ® 03A | 0.45 |
| Trilon ® M (aqueous solution of the trisodium salt of methylglycinediacetic acid) | 0.08 |
| Acticide ® B20 | 0.18 |
| Acticide ® M20 | 0.14 |
| lithium bis-trifluoromethanesulfonimide (HQ-115) | 4.0 |
| Water | Balance |

The first fusing agent including an antistatic agent (lithium bis-trifluoromethanesulfonimide) and a near infrared absorbing compound (carbon black) was used in a three-dimensional printer using a polyether block amide. The first fusing agent was printed throughout the entire volume of the core. Then the second fusing agent and the detailing agent were applied over the core to form an inner shell (about 125 microns thick) and then the second detailing agent was applied over the inner shell to form an external shell (about 125 microns thick).

The resistivity of the printed part was measured with an ohmmeter (V=100 volts, DC). Each three-dimensional printed part was squeezed between two conductive electrodes and conductive rubber pads. Each part was measured three times, in different locations, and the values averaged.

Figure 6:
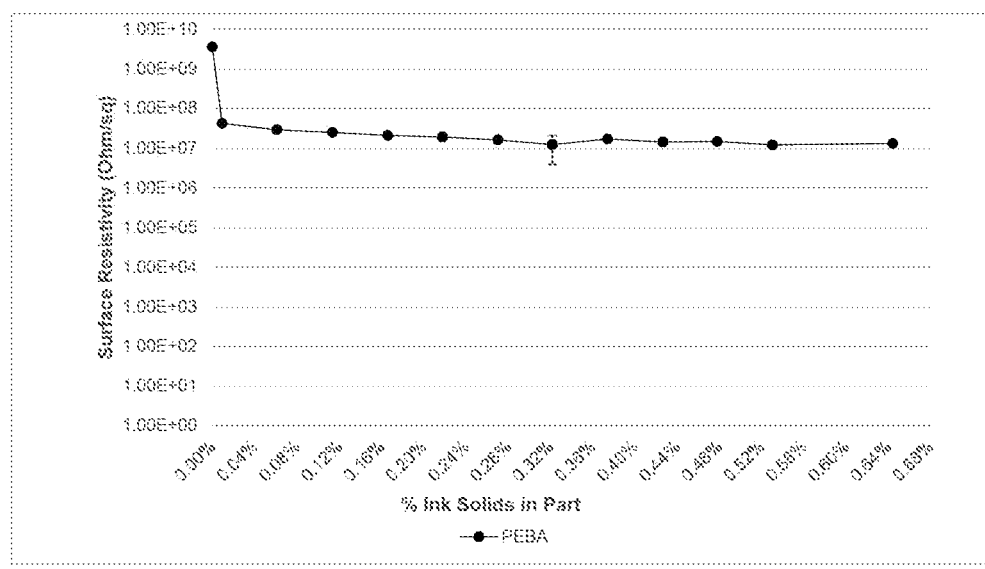
FIG. 6 is an example graph showing surface resistivity per percent solids.
Figure 7:
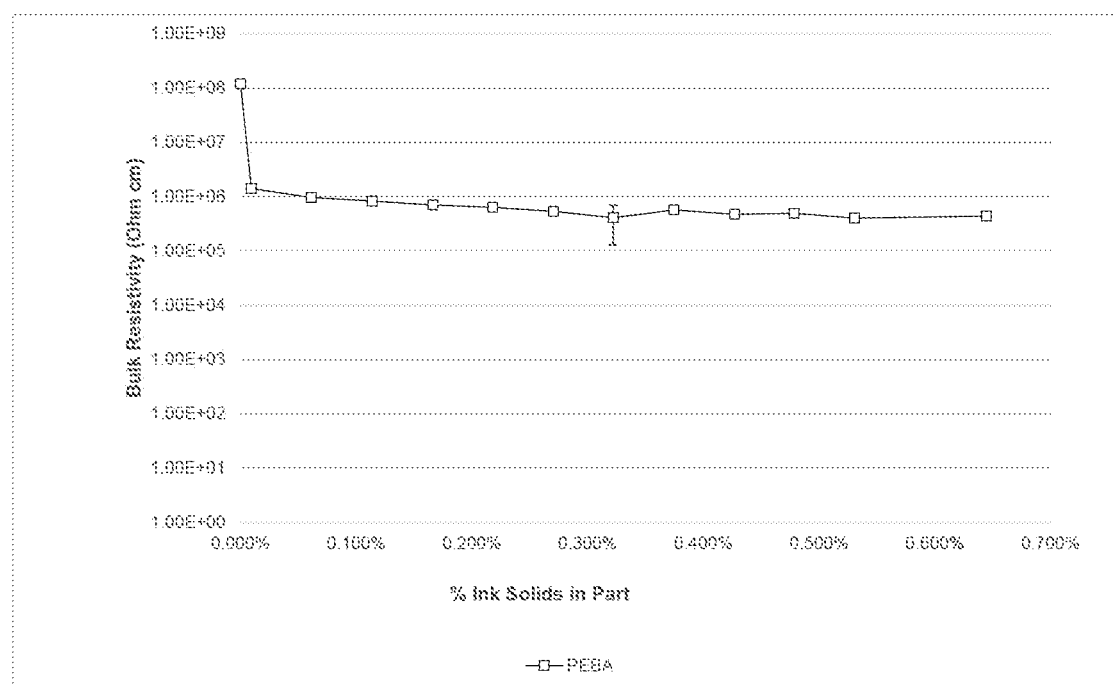
FIG. 7 is an example graph showing surface resistivity per percent solids.

One set of cubes (10 mm3) were printed with the polyether block amide. Within each set increasing amounts of the agent of the formulation described above were used (ranging from 0.00% to 0.60% solids). As can be seen from the data in FIGS. 6 and 7, the increasing amounts of agent present in the three-dimensional part decreased the surface and bulk resistivity of the three-dimensional part.

A decrease in surface and/or bulk resistivity indicates that the presence of the antistatic agent in the core of the three-dimensional printed part is dissipating static charge. The three-dimensional printed part is less likely to build-up static charge on its surface and is less likely to have an ESD event. Because the antistatic agent is located within the core of the three-dimensional printed part it is not able to crack or rub off like post-process coatings and may provide a permanent protection against a static charge.

Although described specifically throughout the entirety of the instant disclosure, representative examples of the present disclosure have utility over a wide range of applications, and the above discussion is not intended and should not be construed to be limiting, but is offered as an illustrative discussion of examples of the disclosure.

What is claimed is:

1. A method of three-dimensional printing comprising:
(i) depositing a layer of build material;
(ii) selectively applying a first fusing agent on the build material, wherein the first fusing agent comprises at least one first antistatic agent; and
(iii) repeating (i) and (ii) at least once to form a core of a three-dimensional part.

2. The method of claim 1 further comprising:
(iv) applying a second fusing agent and a first detailing agent on the core of the three-dimensional part to form an inner shell at least partially enclosing the core, wherein the first detailing agent comprises at least one second antistatic agent; and
(v) applying a second detailing agent on the inner shell, wherein the second detailing agent is free of any near infrared absorbing compound.

3. The method of claim 2, wherein:
the first fusing agent further comprises a first near infrared absorbing compound;
the second fusing agent further comprises a second near infrared absorbing compound; and
the second detailing agent further comprises at least one third antistatic agent.

4. The method of claim 3, wherein:
the first antistatic agent, the second antistatic agent, and the third antistatic agent are different; and
the first near infrared absorbing compound and the second near infrared absorbing compound are different.

5. The method of claim 3, wherein:
the first antistatic agent, the second antistatic agent, and the third antistatic agent are the same, and
the first antistatic agent, the second antistatic agent, and the third antistatic agent are independently selected from the group consisting of $Li_2NiBr_4$, $Li_2CuCl_4$, $LiCuO$, $LiCu_4O(PO_4)_2$, $LiSOCl_2$, $LiSO_2Cl_2$, $LiSO_2$, $LiI_2$, $LiN_3$, $C_6H_5COOLi$, $LiBr$, $Li_2CO_3$, $LiCl$, $C_6H_{11}(CH_2)_3CO_2Li$, $LiBO_2$, $LiClO_4$, $Li_3PO_4$, $Li_2SO_4$, $Li_2B_4O_7$, $LiAlCl_4$, $AuCl_4Li$, $LiGaCl_4$, $LiBF_4$, $LiMnO_2$, $LiFeS_2$, $LiAg_2CrO_4$, $LiAg_2V_4O_{11}$, $LiSVO$, $LiCSVO$, $CF_3SO_3Li$, $LiPF_6$, $LiBF_4$, $LiClO_4$, $LiCuS$, $LiPbCuS$, $LiFeS$, $LiBi_2Pb_2O_5$, $LiBi_2O_3$, $LiV_2O_5$, $LiCoO_2$, $LiNiCoO_2$, $LiCuCl_2$, $Li/Al$—$V_2O_5$, lithium bis(oxalato)borate, $LiN(SO_2CF_3)_2$, $LiN(SOCF_2CF_3)_2$, $LiAsF_6$, $LiC(SO_2CF_3)_3$, $LiN(SO_2F)_2$, $LiN(SO_2F)(SO_2CF_3)$, $LiN(SO_2F)(SO_2C_4F_9)$, $LiOSO_2CF_3$, and combinations thereof; and
the first antistatic agent, the second antistatic agent, and the third antistatic agent are independently selected from the group consisting of a salt of an alkali or alkaline earth metal selected from the group consisting of quaternary amines, chlorates, phosphates, carbonates, borates, phosphonates, sulfates, acetates, citrates, perchlorates, and combinations thereof.

6. The method of claim 3, wherein:
the first antistatic agent is present in an amount of from about 0.1 wt. % to about 10 wt. % based upon a total weight of the first fusing agent;
the second antistatic agent is present in an amount of from about 0.01 wt. % to about 7 wt. % based upon a total weight of the first detailing agent; and
the third antistatic agent is present in an amount of from about 0.01 wt. % to about 7 wt. % based upon a total weight of the second detailing agent.

7. The method of claim 1, wherein the first fusing agent further comprises water, at least one organic solvent, at least one surfactant, and at least one biocide.

8. A three-dimensional printed part comprising:
a core comprising:
a build material selected from the group consisting of polyamides, polyethers, polyethylenes, polyethylene terephthalates, polystyrenes, polyacetals, polypropylenes, polycarbonates, polyesters, thermoplastic polyurethanes, and combinations thereof,
at least one first antistatic agent
an inner shell at least partially enclosing the core, the inner shell comprising the build material and (i) at least one second antistatic agent or (ii) free of any antistatic agent; and
an external shell at least partially enclosing the inner shell, the external shell comprising the build material and (i) at least one third antistatic agent or (ii) free of any antistatic agent.

9. The three-dimensional printed part of claim 8, wherein the first antistatic agent, the second antistatic agent, and the third antistatic agent are the same.

10. The three-dimensional printed part of claim 8, wherein the first antistatic agent, the second antistatic agent, and third antistatic agent are thermally stable at a polymer melt processing temperature.

11. The three-dimensional printed part of claim 8, wherein:
the first antistatic agent, the second antistatic agent, and the third antistatic agent are independently selected from the group consisting of $Li_2NiBr_4$, $Li_2CuCl_4$, $LiCuO$, $LiCu_4O(PO_4)_2$, $LiSOCl_2$, $LiSO_2Cl_2$, $LiSO_2$, $LiI_2$, $LiN_3$, $C_6H_5COOLi$, $LiBr$, $Li_2CO_3$, $LiCl$, $C_6H_{11}(CH_2)_3CO_2Li$, $LiBO_2$, $LiClO_4$, $Li_3PO_4$, $Li_2SO_4$, $Li_2B_4O_7$, $LiAlCl_4$, $AuCl_4Li$, $LiGaCl_4$, $LiBF_4$, $LiMnO_2$, $LiFeS_2$, $LiAg_2CrO_4$, $LiAg_2V_4O_{11}$, $LiSVO$, $LiCSVO$, $CF_3SO_3Li$, $LiPF_6$, $LiBF_4$, $LiClO_4$, $LiCuS$, $LiPbCuS$, $LiFeS$, $LiBi_2Pb_2O_5$, $LiBi_2O_3$, $LiV_2O_5$, $LiCoO_2$, $LiNiCoO_2$, $LiCuCl_2$, $Li/Al$—$V_2O_5$, lithium bis(oxalato)borate, $LiN(SO_2CF_3)_2$, $LiN(SOCF_2CF_3)_2$, $LiAsF_6$, $LiC(SO_2CF_3)_3$, $LiN(SO_2F)_2$, $LiN(SO_2F)(SO_2CF_3)$, $LiN(SO_2F)(SO_2C_4F_9)$, $LiOSO_2CF_3$, and combinations thereof, or
the first antistatic agent, the second antistatic agent, and the third antistatic agent are independently selected from the group consisting of a salt of an alkali or alkaline earth metal selected from the group consisting of quaternary amines, chlorates, phosphates, carbonates, borates, phosphonates, sulfates, acetates, citrates, perchlorates, and combinations thereof.

12. The three-dimensional printed part of claim 8, wherein:
the first antistatic agent is present in an amount of from about 0.1 wt. % to about 10 wt. % based upon a total weight of the core;
the second antistatic agent is present in an amount of from about 0.01 wt. % to about 7 wt. % based upon a total weight of the inner shell; and
the third antistatic agent is present in an amount of from about 0.01 wt. % to about 7 wt. % based upon a total weight of the outer shell.

13. The three-dimensional printed part of claim 8, wherein the build material is polyamide-12, polyether block amide, or a combination thereof.

14. A method of three-dimensional printing comprising:
(i) depositing a layer of build material;
(ii) selectively applying a first fusing agent comprising:
   at least one antistatic agent on the build material,
   at least one first near infrared absorbing compound,
   at least one surfactant,
   at least one organic solvent, and
   water;
(iii) repeating (i) and (ii) at least once to form a core of a three-dimensional part;
(iv) applying a second fusing agent and a first detailing agent on the core of the three-dimensional part to form an inner shell at least partially enclosing the core, wherein the second fusing agent comprises at least one second near infrared absorbing compound, and wherein the first detailing agent is free of any antistatic agent; and
(v) applying a second detailing agent on the inner shell to at least partially enclose the inner shell and form an external shell, wherein the second detailing agent is free of (a) any near infrared absorbing compound and (b) any antistatic agent.

* * * * *